April 30, 1929.  W. APFELBAUM  1,711,257
LABELING MACHINE
Filed March 11, 1927   15 Sheets-Sheet 7

INVENTOR
William Apfelbaum
BY
Marshall & Frawley
his ATTORNEYS.

April 30, 1929. W. APFELBAUM 1,711,257
LABELING MACHINE
Filed March 11, 1927 15 Sheets-Sheet 8
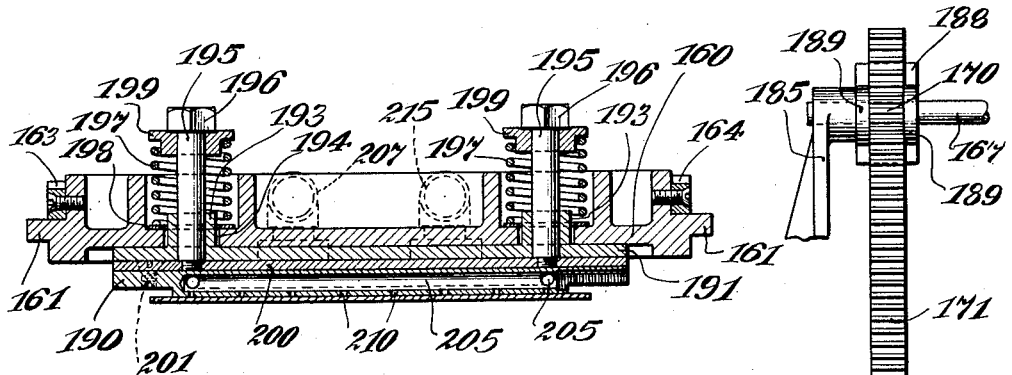
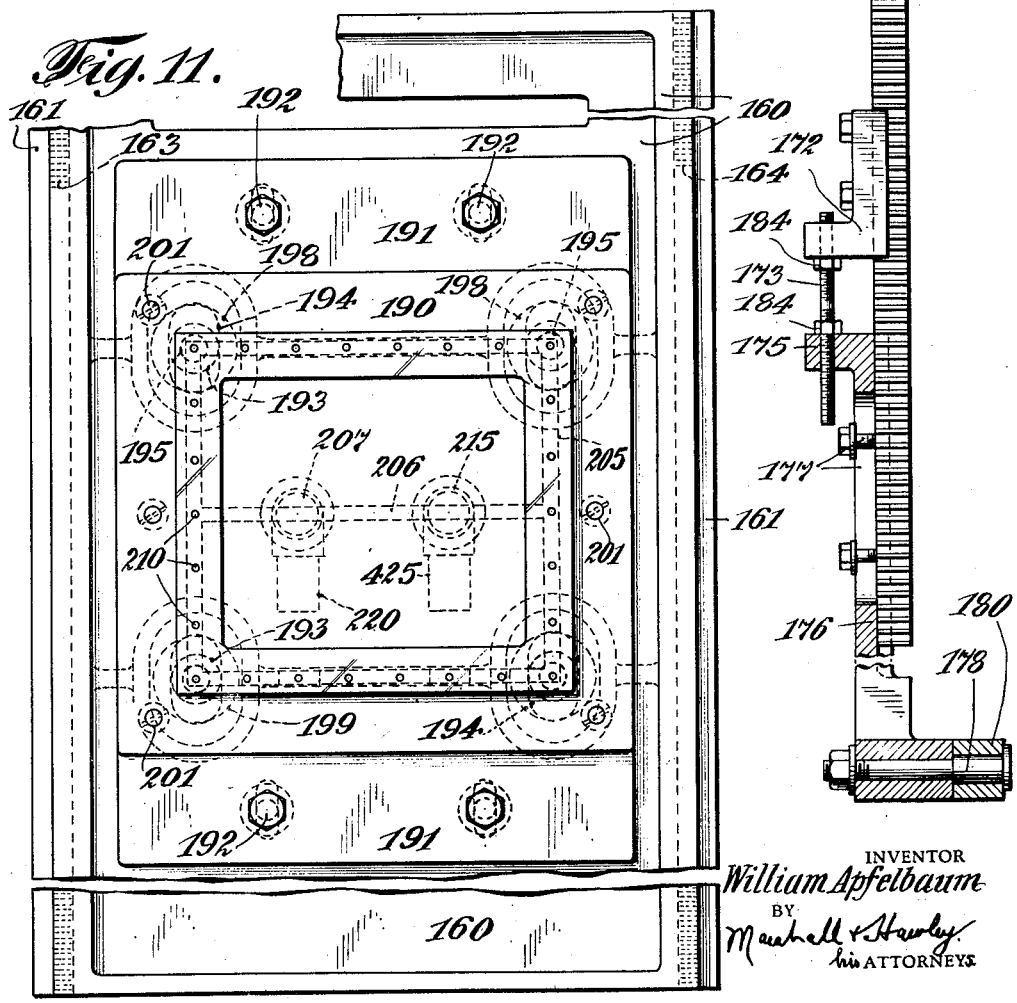
INVENTOR
William Apfelbaum
BY
Marshall & Hawley
his ATTORNEYS

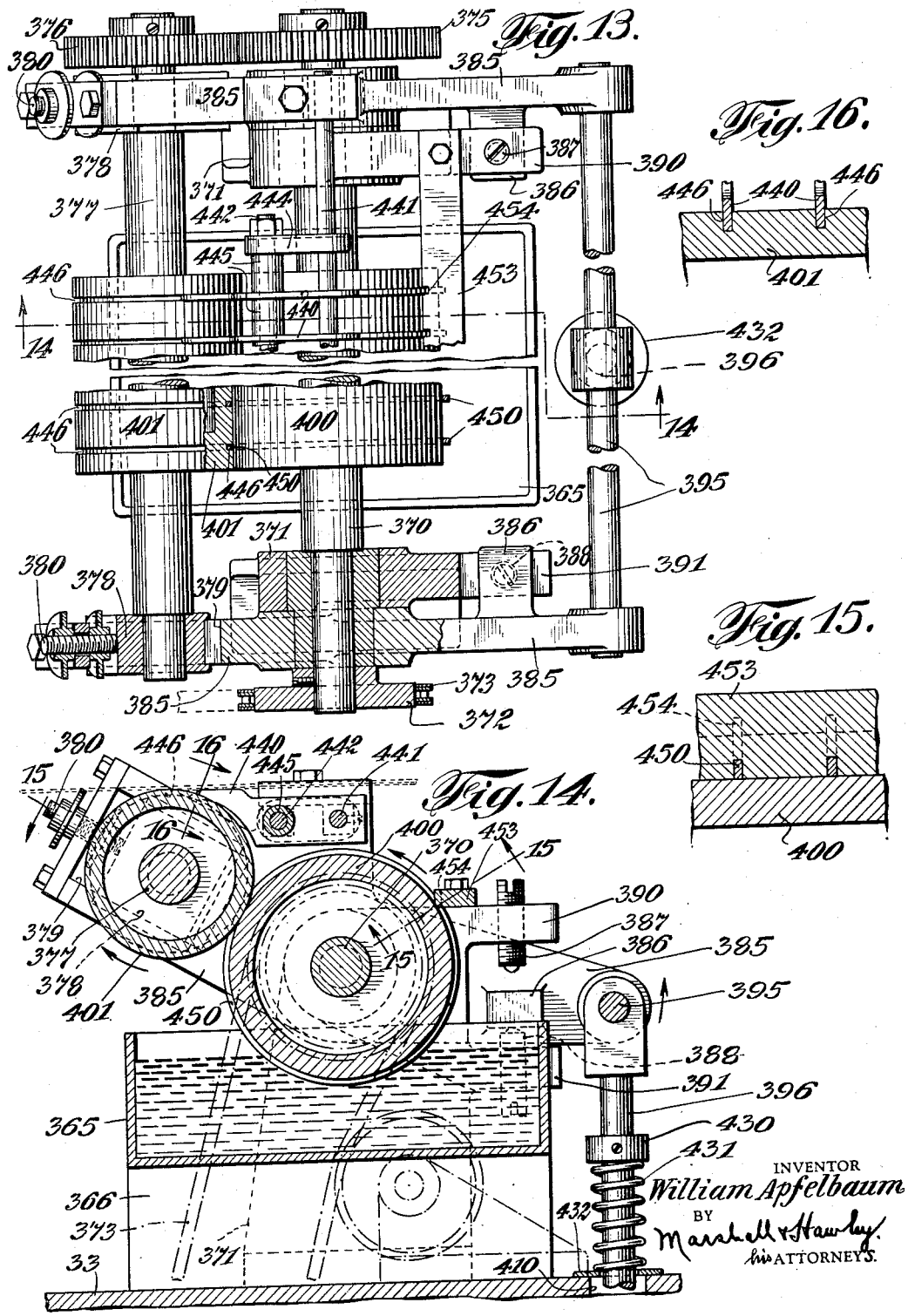

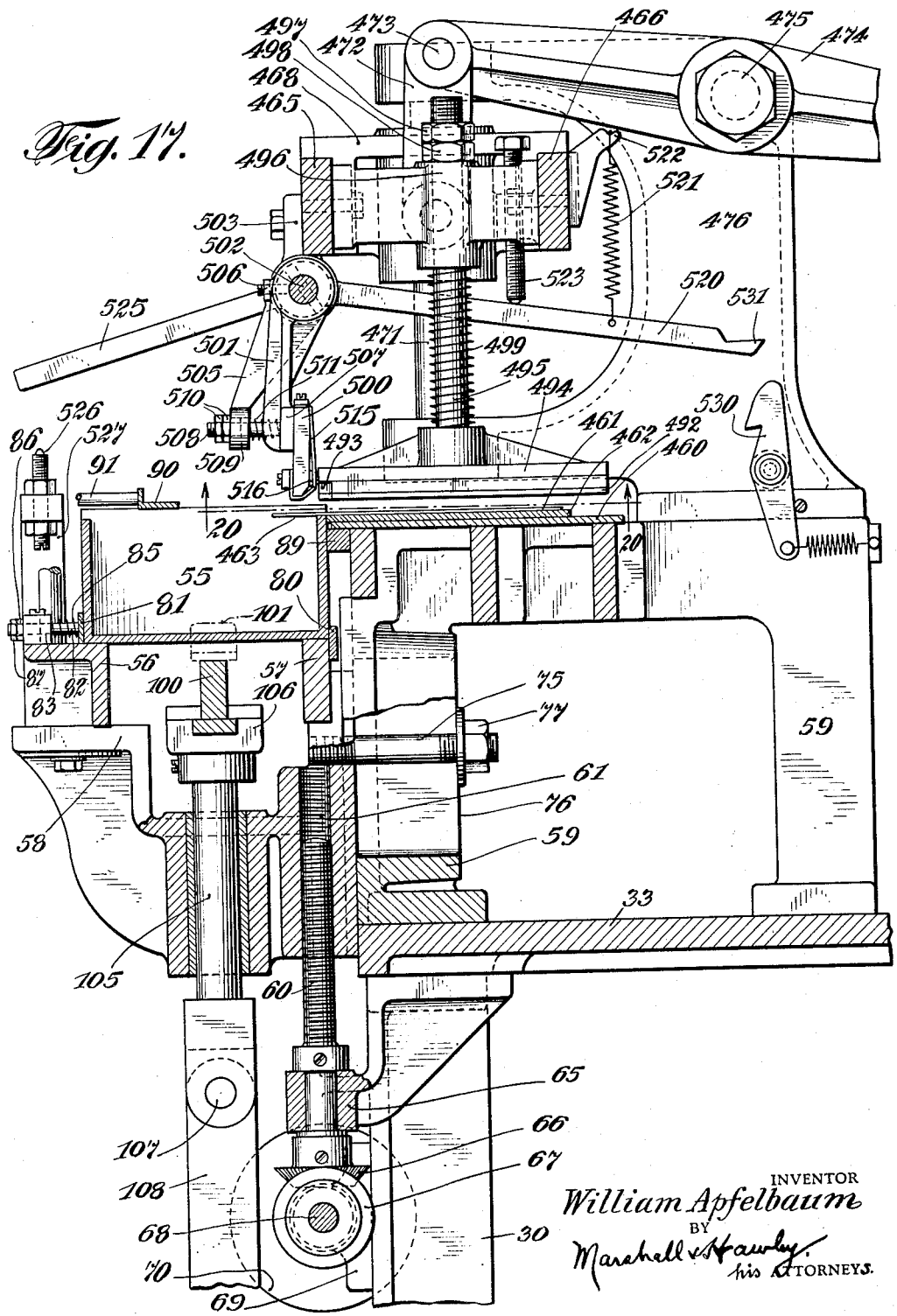

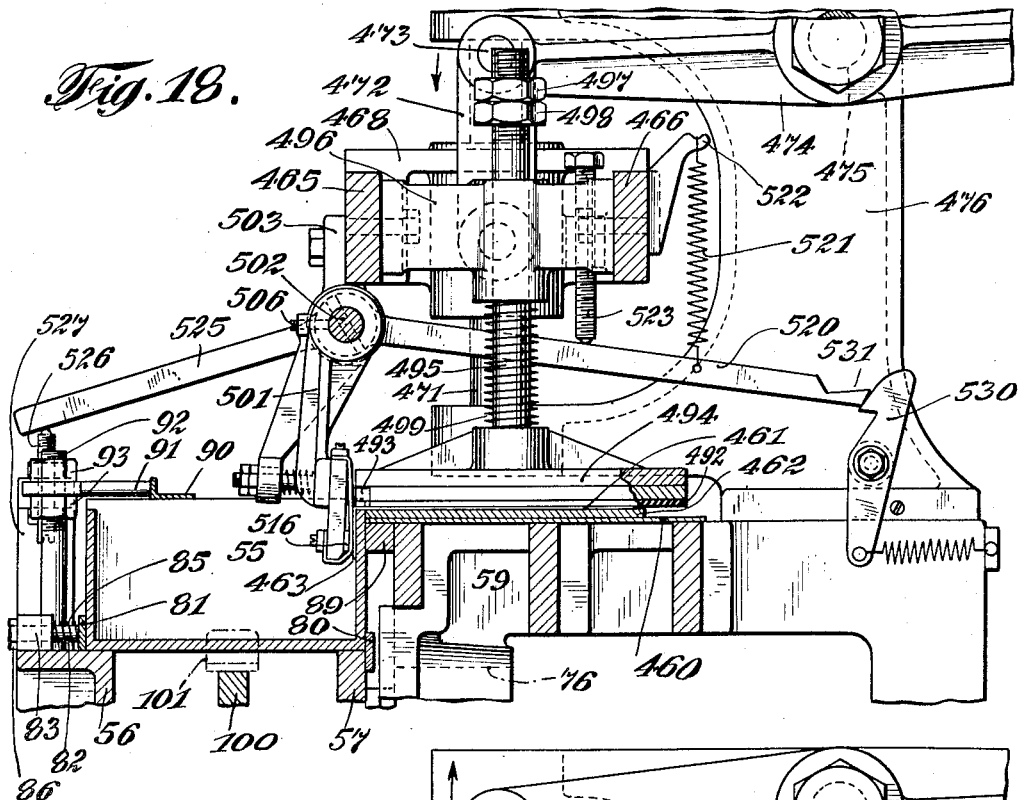
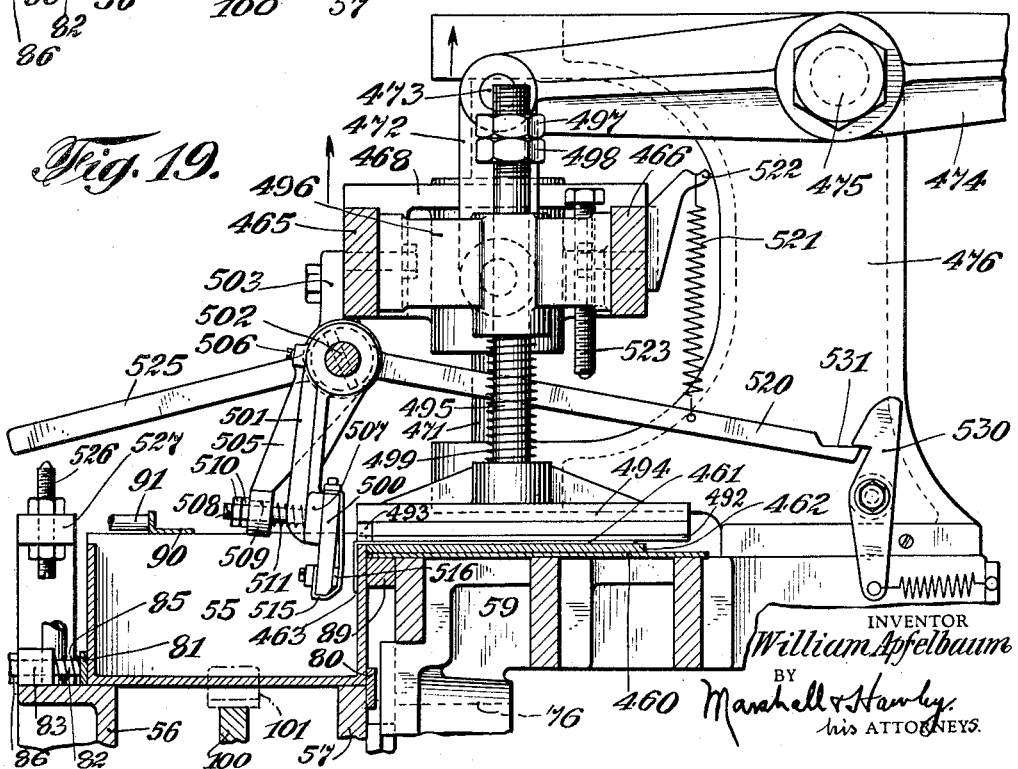

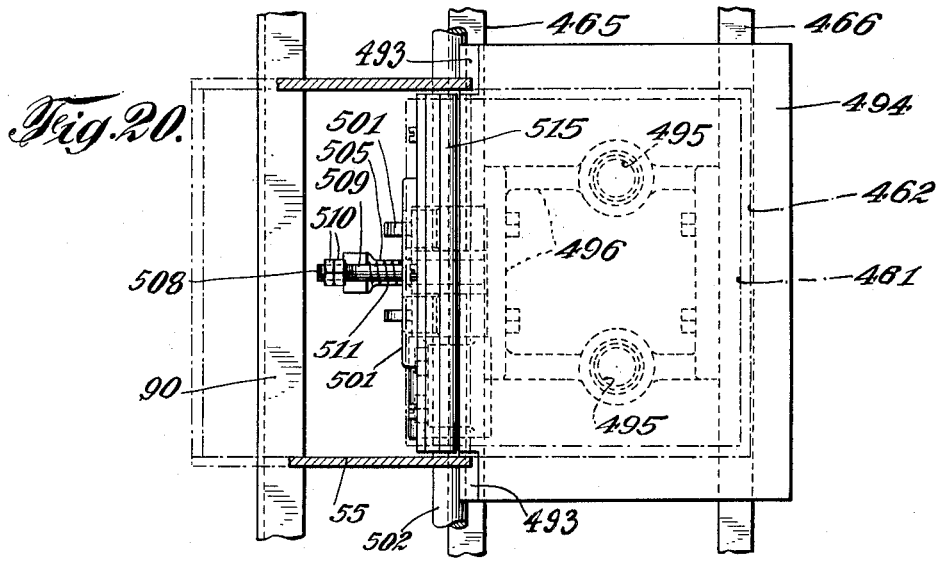
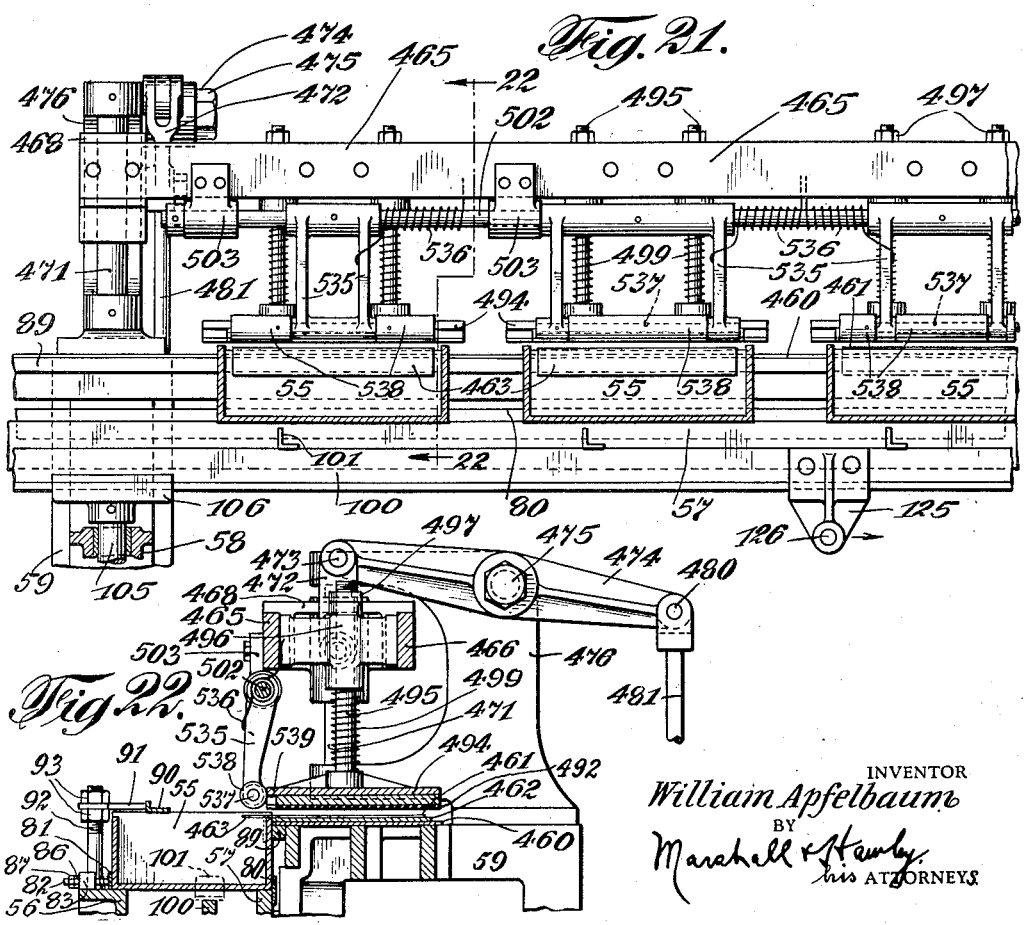

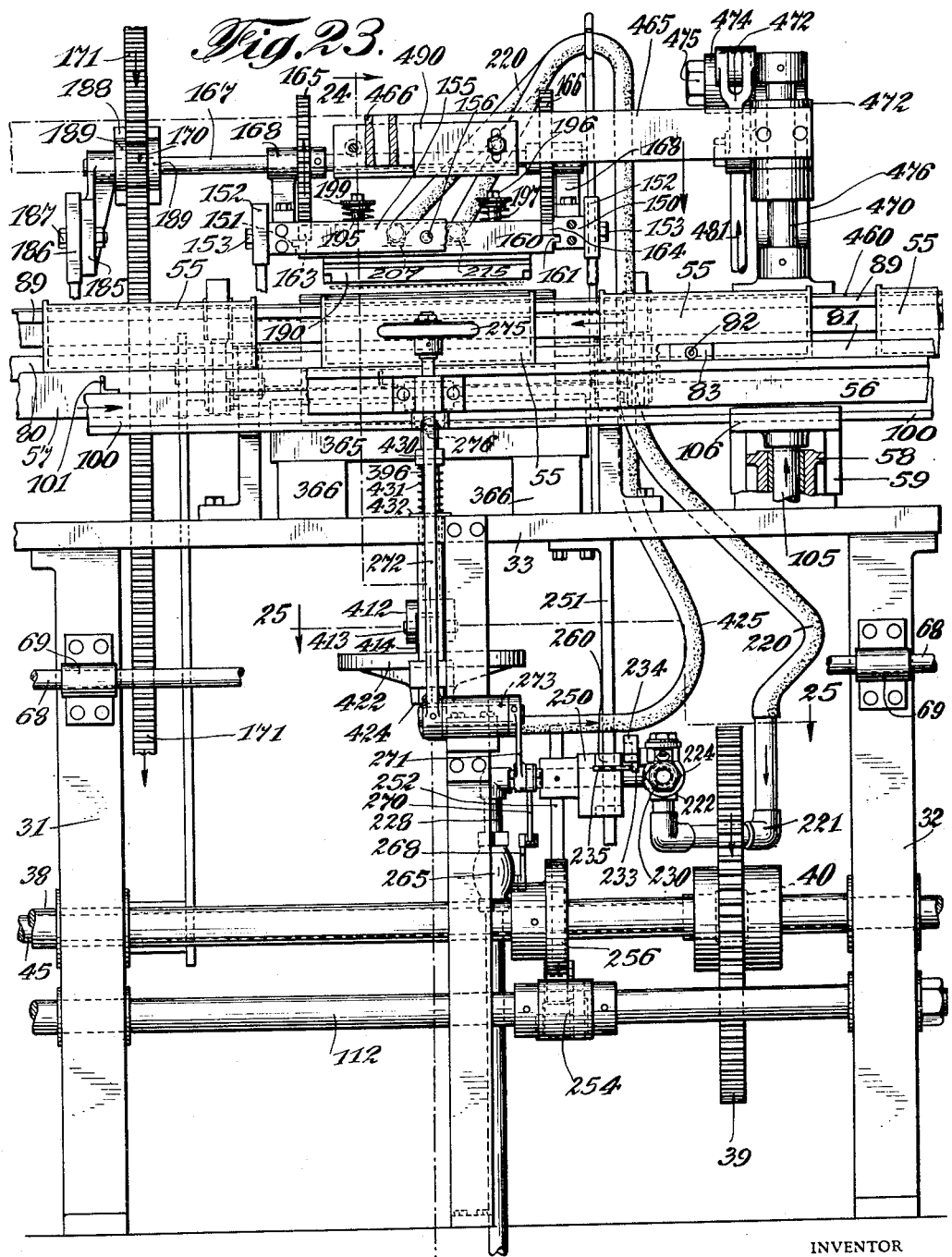

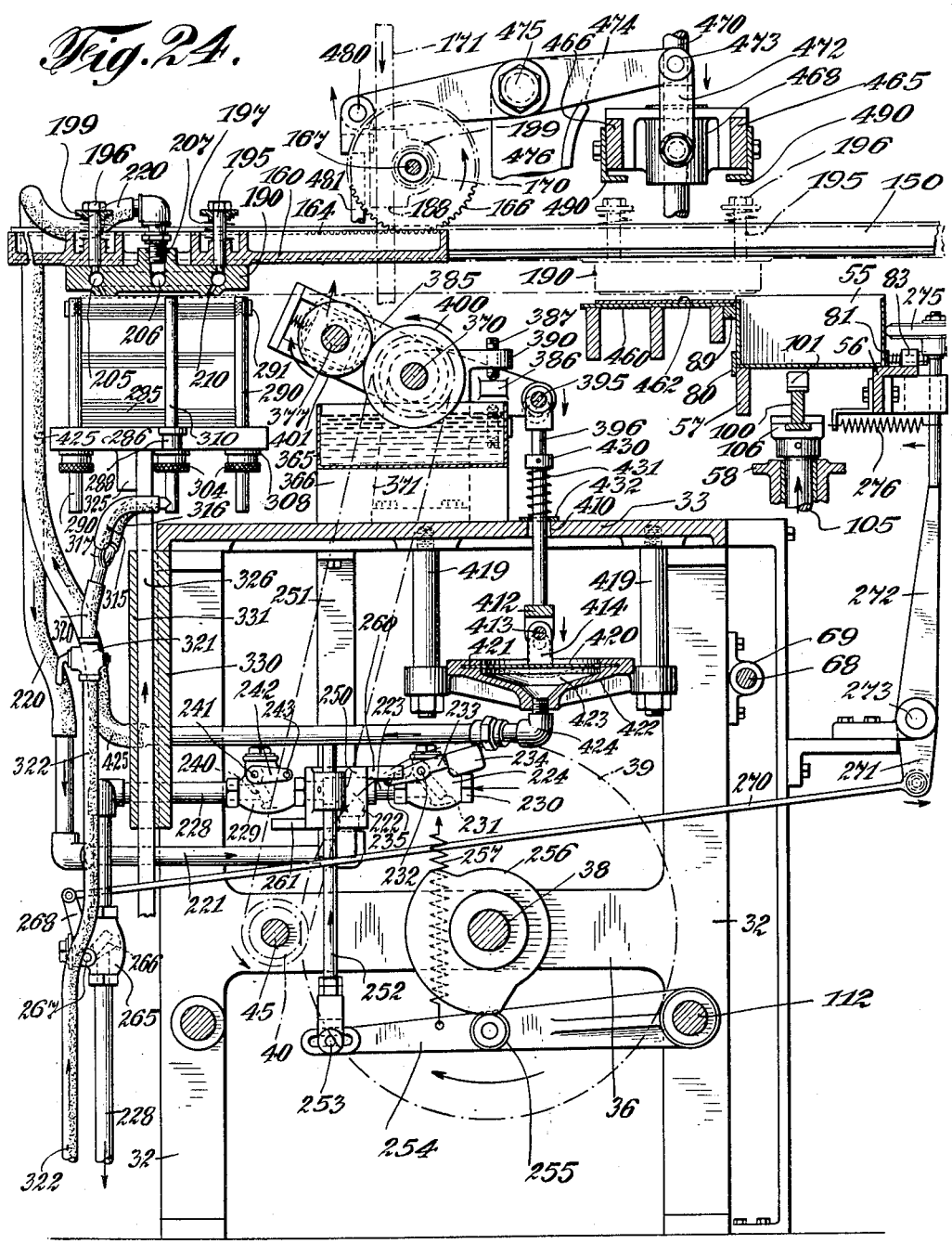

April 30, 1929.  W. APFELBAUM  1,711,257
LABELING MACHINE
Filed March 11, 1927  15 Sheets-Sheet 15
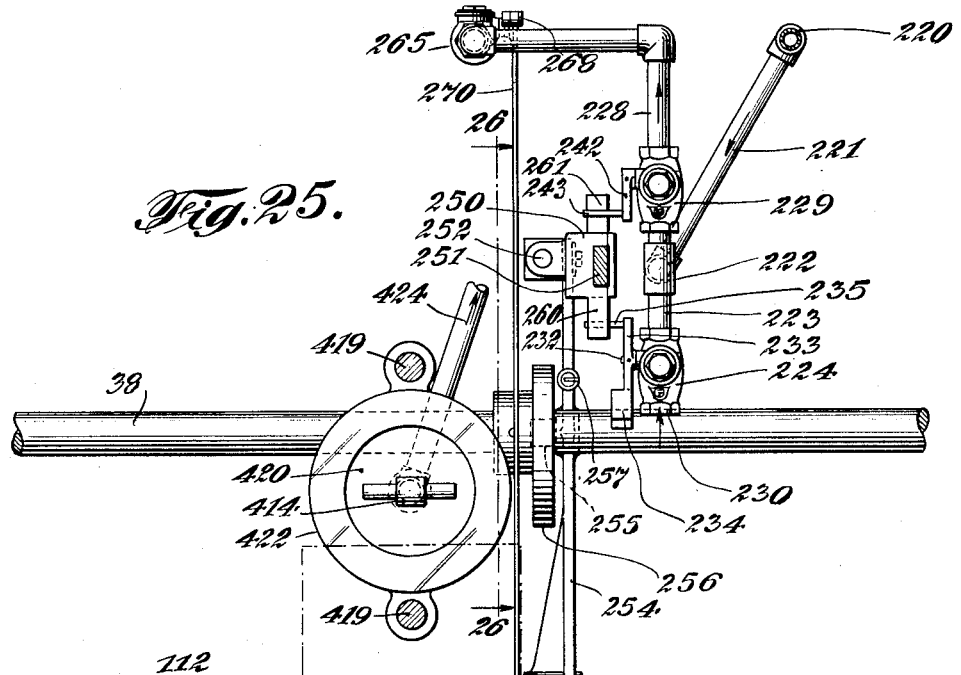
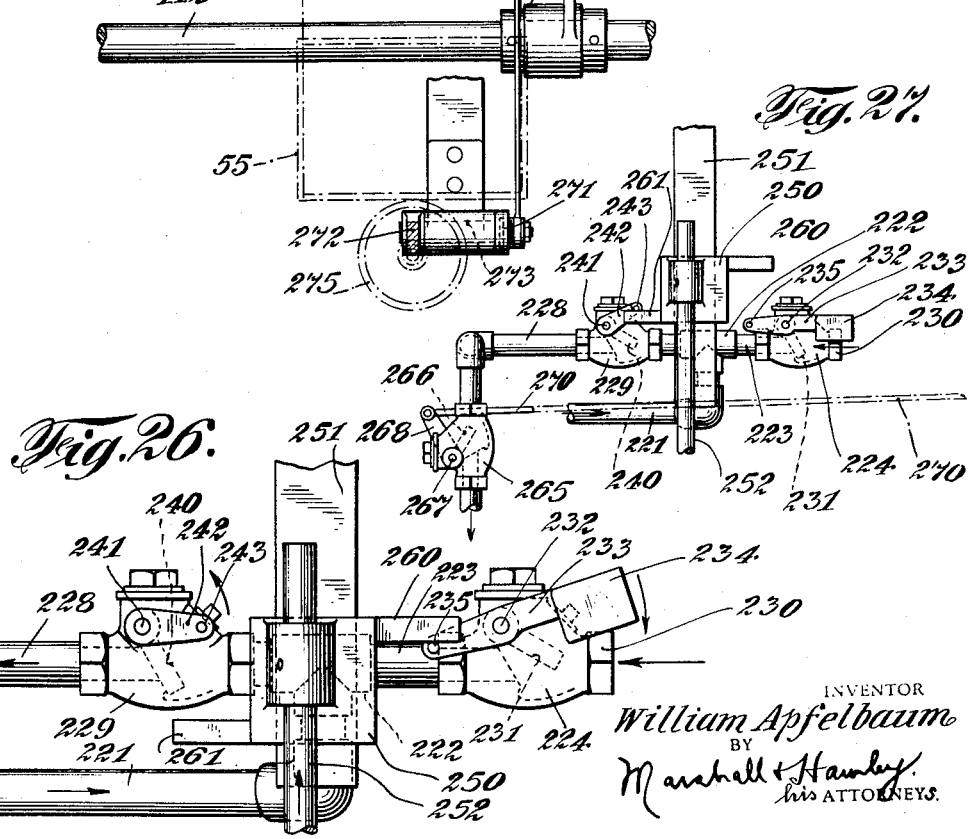
INVENTOR
William Apfelbaum
BY
Marshall & Hawley
his ATTORNEYS.

Patented Apr. 30, 1929.

1,711,257

UNITED STATES PATENT OFFICE.

WILLIAM APFELBAUM, OF BROOKLYN, NEW YORK, ASSIGNOR TO THE PULPORE CAN & BOX CO., INC., OF BROOKLYN, NEW YORK, A CORPORATION OF NEW YORK.

LABELING MACHINE.

Application filed March 11, 1927. Serial No. 174,441.

This invention relates to labeling machines.

More specifically stated, the invention relates to an automatic machine for applying and securing labels to articles, such as cigar box covers.

The salient object of the invention is to provide a simple, practical and efficient automatic machine for applying and securing labels to articles, such as boxes or covers for boxes.

Another object of the invention is to provide a machine of the character described having control means for the label transfer and feeding mechanism so constructed and arranged that a label will be fed only when the article to which the label is to be applied is in position to receive the label.

Another object of the invention is to provide a machine of the character described having adhesive applying mechanism and control means for such mechanism so constructed and arranged that the mechanism will be moved to operative position only when a label has been fed and is in position to receive the glue or other adhesive.

Another object of the invention is to provide a machine of the character described having novel and efficient means for pressing the label on the article to be labeled.

Another object of the invention is to provide a machine of the character described having means for properly positioning the labels for engagement by the label feed and transfer mechanism.

Further objects of the invention will appear from the following specification taken in connection with the drawings, which form a part of this application, and in which Fig. 1 is a top plan view of a machine constructed in accordance with the invention;

Fig. 10 is a detail sectional elevation of the suction or transfer head taken substantially on line 10—10 of Fig. 9;

Fig. 11 is a bottom plan view of the label transfer or suction head;

Fig. 12 is a detail sectional elevation of the rack and pinion for operating the label transfer carriage;

Fig. 13 is a top plan view partly in section showing the adhesive applying mechanism;

Fig. 14 is a sectional elevation taken substantially on line 14—14 of Fig. 13;

Figure 1:
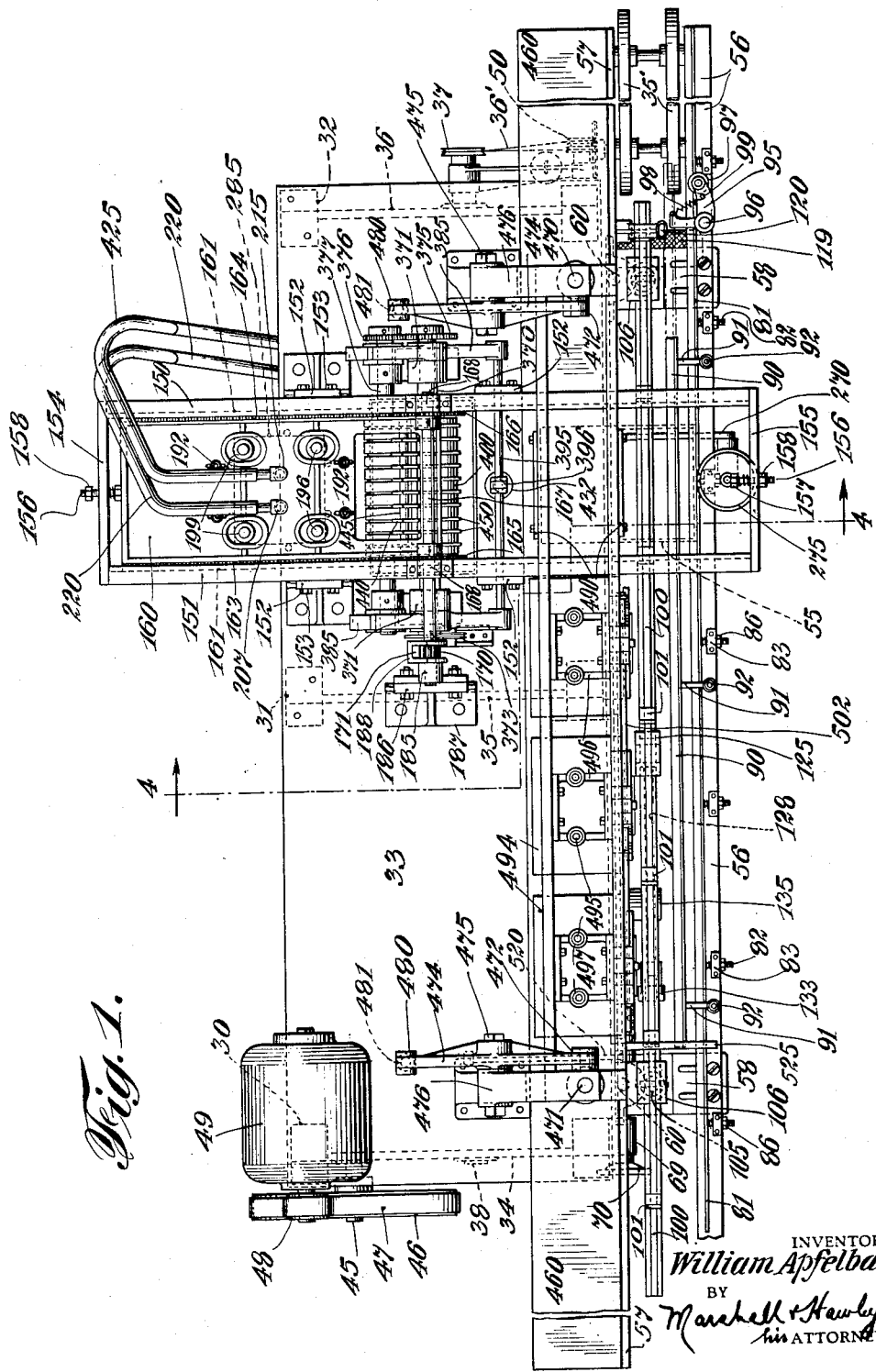

Figs. 15 and 16 are sectional elevations taken substantially on lines 15—15 and 16—16 of Fig. 14;

Fig. 17 is a sectional elevation illustrating the construction and operation of the presser devices for securing the label to the box cover and to the inside of one wall of the box, these parts being shown in inoperative position;

Fig. 18 is a sectional elevation similar to Fig. 17 but showing the presser devices in operation;

Fig. 19 is a view similar to Fig. 18 but showing the parts at a later period in their cycle of operation;

Fig. 20 is a sectional elevation taken substantially on line 20—20 of Fig. 17;

Fig. 21 is a sectional elevation of a slightly modified form of presser devices similar to those shown in Figs. 17 to 19 inclusive;

Fig. 22 is a sectional elevation taken substantially on line 22—22 of Fig. 21;

Fig. 23 is an elevational view of a portion of the machine illustrating the control mechanism whereby the suction for the label transfer or suction head is cut off when no article is positioned to receive the label;

Fig. 24 is a sectional elevation taken substantially on line 24—24 of Fig. 23;

Fig. 25 is a plan view parallel in section taken substantially on line 25—25 of Fig. 23;

Fig. 26 is an elevational view showing the suction and air valves and the adjacent parts; and Fig. 27 is a view similar to Fig. 26, but showing the parts in a different position of adjustment and also showing a portion of the control whereby the suction main is closed when there is no article in position to receive a label.

The invention briefly described consists of an automatic machine having mechanism for feeding articles, such as cigar boxes, in position to receive a label, mechanism for feeding labels one at a time from a stack to a position above the article to receive the label, means for applying adhesive, such as glue, to the under surface of each label as it is fed by the label feeding and transfer mechanism, mechanism for transferring the label from the label feeding mechanism to the article and for subsequently and successively pressing the label into engagement with the article whereby it is secured thereto by the adhesive.

Various controls are provided. One set of control means prevents the feeding of a label by the label feeding and transfer mechanism unless the article to which the label is to be secured is in position to receive the label. Other control mechanism prevents the movement of the adhesive applying means to operative position unless a label has been fed and is in position to receive the adhesive or glue.

Various novel features are incorporated in the box feed mechanism, label feeding mechanism, adhesive applying mechanism and label transfer and presser devices and these will be brought out in more detail in the following description.

In order to make clear the construction and operation of the various parts of the machine, these parts will be described under several different headings.

Box feed mechanism.

For an illustration of the structure of the box feed mechanism, attention is particularly directed to Figs. 1, 2, 3, 4, and 17.

In the particular form of the invention illustrated, the machine framework comprises a plurality of upright supporting members or legs 30, 31 and 32 which have secured to their upper ends a bed plate or table 33. The legs are connected by vertical webs 34, 35 and 36.

The machine particularly illustrated was designed for applying labels to the inside of the covers of cigar boxes, although it should be understood that the particular features hereinafter described are capable of general application and can be used for applying labels to any desired articles.

The cigar boxes are fed into the machine on an endless conveyor 35' which is driven by a belt 36' from a pulley 37 mounted on a shaft 38. The shaft 38 is driven by gearings 39 and 40 from a shaft 45 to which is secured a pulley 46. The pulley 46 is driven by a belt 47 which in turn is driven from a pulley 48 mounted on the shaft of a motor 49. A belt tightener 50 is provided for keeping taut the belt 36.

As they travel through the machine, the boxes 55 are supported on a pair of longitudinally extending bars or rails 56 and 57. The rails 56 and 57 are carried by a pair of brackets 58 adjustably carried by a frame 59 mounted on the bed plate or table 33. Means is provided for vertically and simultaneously adjusting the brackets 58. This means comprises a screw 60 which extends into a threaded opening 61 in each of the brackets. Each screw is rotatably mounted in a bracket 65 but is held against longitudinal movement with reference to the bracket. Each screw has secured to its lower end a bevel gear 66 which meshes with a gear 67 carried by a shaft 68 mounted in bearings 69 secured to the upright supporting members 30, 31 and 32. The shaft 68 can be rotated by a hand wheel 70 secured to one end thereof.

Each of the brackets 58 is mounted in suitable guideways on the frame 59 and has a threaded stud 75 extending through a slot 76. Each stud has a nut 77 at the free end thereof by means of which the bracket can be secured in adjusted position.

It will be evident that as the shaft 68 is rotated by the hand wheel 70 in one direction or the other, the brackets 58 will be simultaneously raised and lowered, thus raising the lowering the tracks or bars 56 and 57 carried thereby.

The track 57 has secured to its rear edge an abutment strip 80 adapted to engage the back of the box and the track 56 has secured thereto an adjustable pressure strip 81 having studs 82 slidably mounted in lugs 83. Each stud has mounted thereon intermediate the lug 83 and the strip 81, a spring 85 which tends to press the strip against the front wall of the box. A nut 86 is secured to the outer end of each stud 82 for limiting the movement of the stud by the spring and lock nuts 87 are mounted on the studs outside the nuts 86. A bar 89 is secured to the frame 59 and is so proportioned that its front edge will be alined with the front surface of the strip 80, thus forming a bearing for the rear wall of the box as the box is fed along the tracks or rails 56 and 57.

In order to retain the boxes firmly on the rails or tracks 56 and 57, a presser strip or bar 90 is positioned to engage the upper ends of the end walls of the box. This strip is carried by rods 91 adjustably mounted on the upper ends of threaded studs 92 which are secured to and extend upwardly from the track or rail 56. The height of the strip 90 can be regulated by turning nuts 93 which are carried by the studs 92 and are positioned on opposite sides of the rods 91.

In order to properly position the boxes for their feeding movement on the rails 56 and 57 and to prevent the boxes from being fed to the rails by the conveyor at the wrong period in the cycle of operation of the machine, an arm 95 is pivoted at 96 to the rail 56 and has a roller 97 at the free end thereof adapted to engage the front of the foremost box on the endless conveyor 35 and to hold the box in position to be engaged by the feeding means hereinafter described. The arm 95 is pressed in one direction by a spring 98, the movement of the arm under the action of the spring being limited by a stop 99.

The boxes are fed along the tracks or rails 56 and 57 by means of a feed bar 100 having lugs 101 extending upwardly therefrom and adapted to engage the rear walls of the boxes as they come from the conveyor 35'.

The lugs 101 on the feed bar 100 intermittently engage the boxes and the bar is given a longitudinal and vertical or up and down movement. The bar is carried by a pair of plungers 105 reciprocably mounted in the brackets 58. The upper ends of the plungers have heads 106 secured thereto in which the bar 100 is slidably mounted.

Each plunger has connected to its lower end by a pivotal connection 107, a link 108. Each link has a slot 109 at its lower end which receives a pivot stud 110 carried at one end of a lever 111 pivoted on a shaft 112 on the frame of the machine. The lever 111 also has a roller or stud 113 disposed in a cam groove of a cam 114 mounted on the cam shaft 38. Thus, as the lever 111 is raised and lowered by means of the cam, the links or bars 108 will also be raised and lowered, thus elevating or depressing the plungers 105 and the feed bar 100 carried thereby.

In order to provide for a try-out of the box feed mechanism, the gear 39 is connected to the shaft 38 through a clutch 116 which is normally operative to connect the cam to the shaft. A clutch actuating lever 117 is pivoted on a stud 118 secured to the cross web 36 of the frame and has a foot treadle 119 at its outer end. In order to throw out the clutch between the gear 39 and the shaft 38, the foot treadle 119 is depressed and is held in depressed position by means of a lever 120. This construction forms no part of the present invention and need not be further described.

The feed bar is moved longitudinally in the plunger heads 106 in the following manner. The bar 100 has secured thereto and depending therefrom a bracket 125 to which there is pivoted at 126 a threaded connector 127. A rod 128 is threaded at 129 in the connector 127 and is secured in position by means of lock nuts 130. The opposite end of the rod 128 is pivoted at 133 to a lever 134 which in turn is pivoted at 135 to a bracket 136 secured to the under surface of the table or bed plate 33. The other end of the lever 134 is pivoted at 135' to a link 137. The link 137 is also pivoted at 138 to a crank arm 140 secured to one end of the shaft 141 which is driven by a bevel gear connection 142, 143 from the shaft 38.

The longitudinal and vertical movement of the feed bar 100 just described combine to give this bar a rearward, upward, forward and downward cycle of movement. As the bar is given this movement, the lugs 101 engage the boxes mounted on the rails 56 and 57 and feed the boxes from the label applying mechanism to the successively operating presser devices.

*Label feed and transfer mechanism.*

The labels are arranged in a stack and are removed from the stack one at a time by a suction or transfer head and the head is moved with a transfer carriage from label receiving to label discharging position.

The label transfer carriage is particularly illustrated in Figs. 1 to 6 inclusive and Fig. 12.

Figure 6:
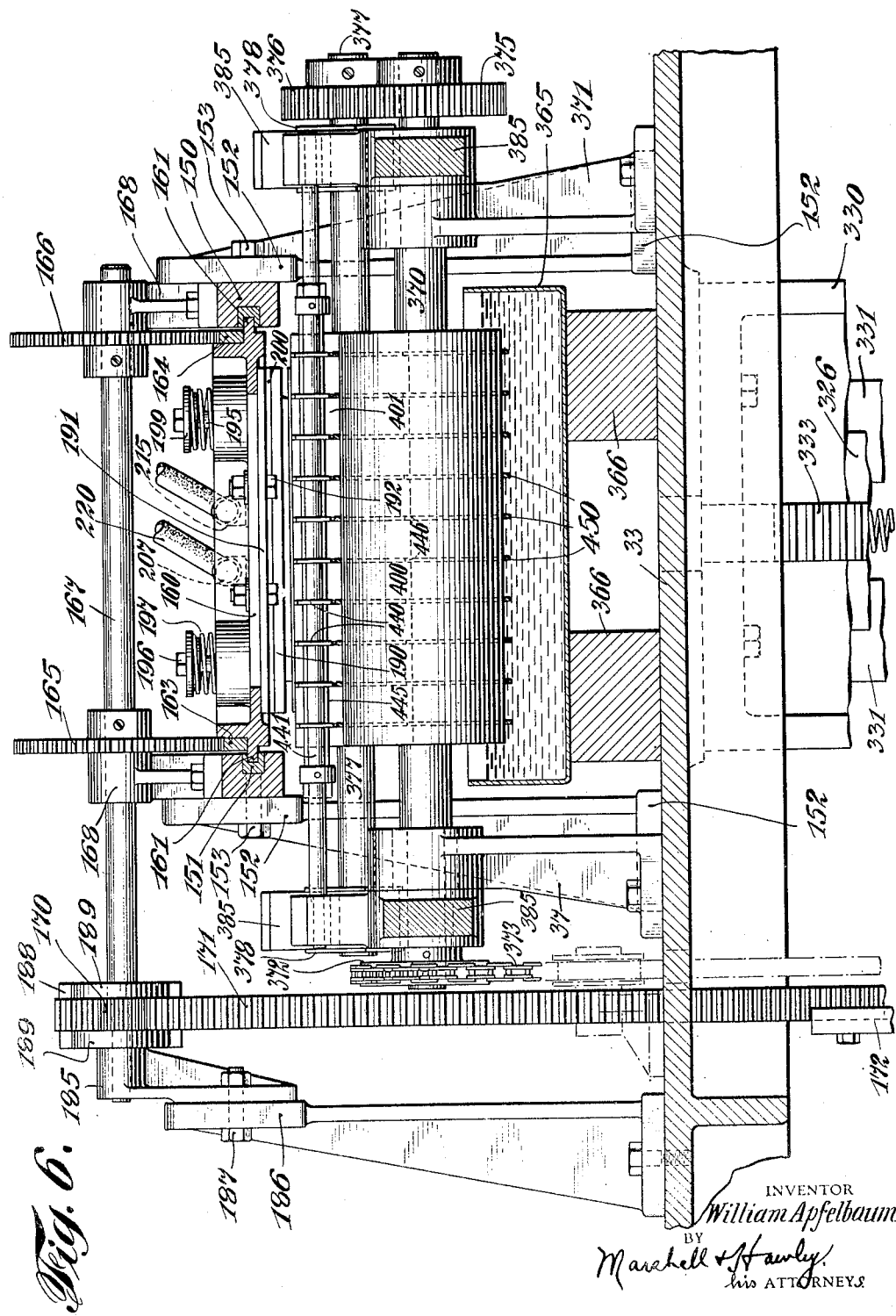
Fig. 6 is a sectional elevation taken substantially on line 6—6 of Fig. 5.
Figure 7:
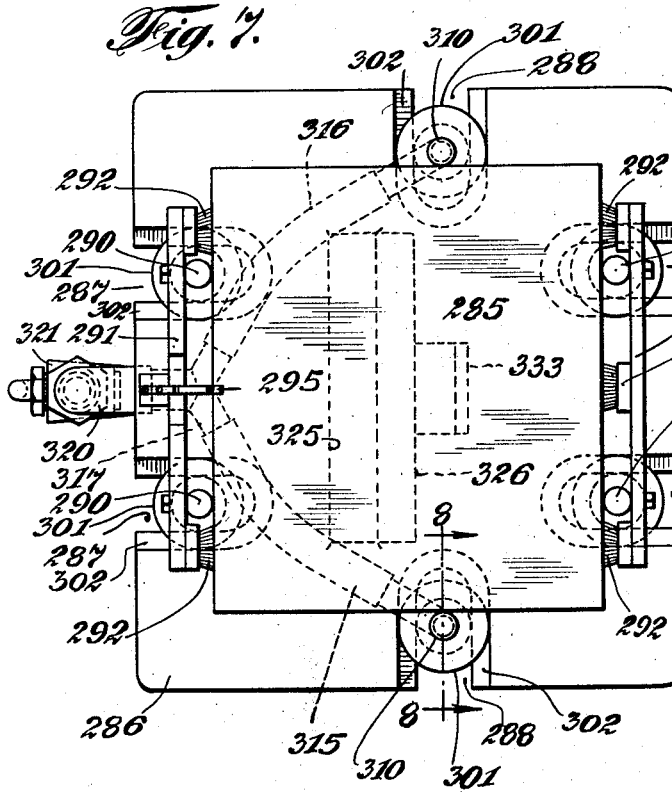
Fig. 7 is a top plan view of the label supply frame or holder.

The transfer carriage as shown in Fig. 6 is mounted in guideways 150, 151 adjustably carried by supports 152 as shown at 153 (see Fig. 4) mounted on the bed plate or table 33. The tracks 150 and 151 are connected at their ends by cross pieces 154 and 155 having studs 156 extending therethrough. The studs have heads or nuts 157 on their inner ends and also have adjustable nuts 158 on their outer ends and each stud is surrounded by a spring 159 interposed between the cross pieces 154 or 155 and the head 157. The studs, therefore, form resilient bumpers or stops at the two limits of travel of the transfer carriage. The transfer carriage consists of a frame 160 having laterally extending flanges 161 positioned in the tracks or guideways 150, 151. The frame 160 also has secured thereto at the longitudinal edges thereof, a pair of racks 163, 164 engaged respectively by gears 165, 166 carried by a shaft 167 supported in bearings carried by brackets 168. Shaft 167 is also supported in a bearing 185 adjustably mounted at 187 on a bracket 186 secured to the base plate 33.

The shaft 167 also has secured thereto a pinion 170 which is engaged by a reciprocable rack 171. The rack 171 has a bracket 172 secured thereto. The rack 171 is held in mesh with the pinion 170 by a U-shaped guide 188 having its legs 189 mounted on shaft 167. A screw 173 has right and left hand threads and is threaded into the bracket 172 and into a lug 175 carried by a bar 176 adjustably connected at 177 to the rack. The bar 176 has a pivot pin 178 at its lower end which engages one end of a lever 180 pivoted on the shaft 112. The lever 180 has secured thereto a stud or roller 181 which is positioned in a cam groove of a cam 182 mounted on the cam shaft 38.

It will be evident that the adjustable connection between the bar 176 and the rack will vary the throw of the label transfer carriage. This adjustment is accomplished by loosening lock nuts 184 on the screw 173 and loosening the bolts shown at 177. Screw 173 can then be turned to give the desired adjustment and thereafter the lock nuts and bolts are tightened, securing the parts in adjusted position.

The carriage 160 has adjustably mounted thereon a suction or transfer head 190. The construction of the head and the mounting thereof are particularly shown in Figs. 9 to 11 inclusive. The suction head 190 is carried by a plate 191 adjustably connected as shown at 192 to the transfer carriage 160. The plate 191 has apertured bosses 193 extending upwardly therefrom through elongated slots 194 formed in the transfer carriage 160. A stud 195 extends upwardly through each of the bosses 193 and has a head at its upper end 196. A spring 197 surrounds each stud and is positioned between the head 196 and a washer 198 which rests on the upper surface of the transfer carriage and bridges the elongated slots therein.

Each of the studs 195 is connected at its lower end to a plate 200 to which is secured by screws 201, the suction head 190. It will be understood that the studs 195 are slidable in the bosses 193.

The suction head has a conduit 205 which extends around the four sides of the suction head and is connected by a conduit 206 to a suction intake conduit 207.

Figure 9:
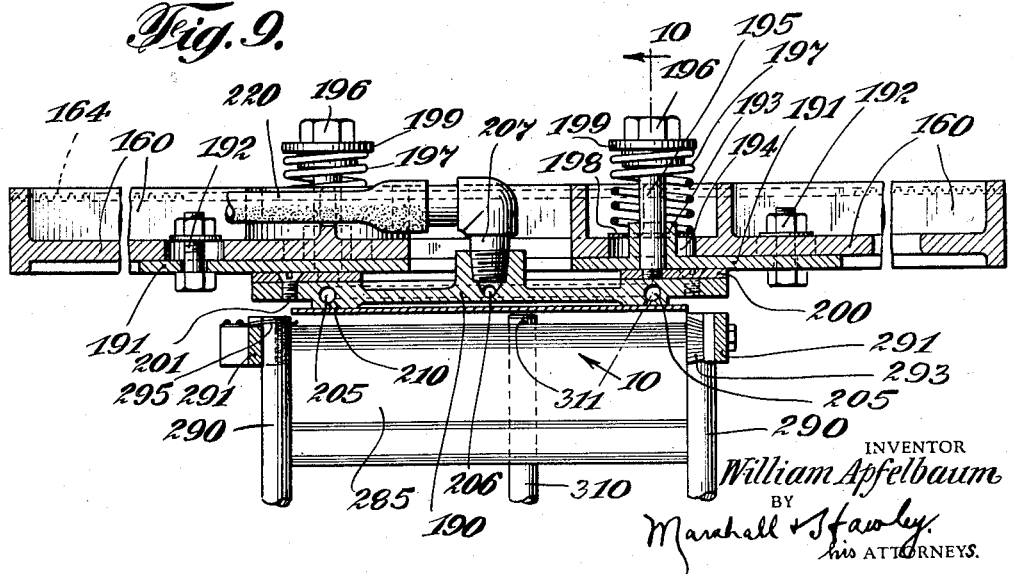
Fig. 9 is an enlarged sectional elevation illustrating the construction of the label transfer carriers and suction head.

The conduit 205 is provided with a plurality of openings 210 which as shown in Fig. 9 extend from the conduit to the lower surface of the suction head 190.

A suction conduit 215 is also connected to the conduit 206 and through this conduit communicates with the suction intake conduit 207.

*Suction control mechanism.*

The conduit 207 is connected by a flexible hose connection 220 to a conduit 221 having a T head coupling 222 connected thereto. The coupling has connected to opposite sides thereof, an air intake conduit 223 having a valve casing 224 and a suction conduit 228 having a valve casing 229 interposed between the suction conduit and the T head coupling. The suction main 228 is connected to a suction pump or other suitable suction device.

The valve casing 224 which receives air at atmospheric pressure through one end 230, has a valve 231 for controlling the admission of air to the conduit 223. The valve 231 has a pintle 232 on which is mounted a lever 233 having a weight 234 at one end thereof and a laterally projecting pin 235 at the other end thereof.

The suction intake valve casing 229 has a valve 240 mounted on a pintle 241 having an arm 242 connected thereto and provided with a laterally projecting pin 243.

The air and suction valves are controlled by a slide block 250 slidably mounted on a bar 251 secured to and depending from the table or bed plate 33. The block 250 is carried by or secured to a rod or post 252 connected at its lower end 253 to a lever 254 pivoted on the shaft 112. The lever has a roller 255 which is held in engagement with a cam 256 by means of a spring 257. Cam 256 is mounted on the cam shaft 38.

The block 250 has a pair of laterally extending lugs 260 and 261 adapted respectively to engage the pins 235 and 243 in different positions of adjustment of the block.

In Fig. 26, the lug 260 engages the pin 235 of the air control lever 233 and the air intake conduit 223 is open to the atmosphere through the casing 224.

In Fig. 27, the lug 261 engages the pin 243 of the suction control valve 240 and this valve is held open permitting suction from the conduit 228 to be communicated through the casing 229 and T head 222 and to the conduit 221.

As shown in Fig. 27, the suction main 228 has a valve casing 265 in the suction line between the valve casing 229 and the source of suction. A valve 266 is mounted in the casing 265 and on a pintle 267 and an arm 268 is connected to the pintle. A link 270 is secured to the outer end of the arm and is also secured to the lower end 271 of a lever 272 mounted on a pivot 273 as shown in Fig. 24. The lever 272 has secured to its upper end, a roller 275 adapted to engage the outer wall of a box 55 when the box is positioned to receive a label. The lever 272 is actuated in one direction by a spring 276 in such a manner that the roller 275 at the upper end thereof will be moved inwardly toward the box or inwardly in case a box is not in position.

From the foregoing description it will be evident that when no box is in position to receive the label, the lever 272 will be swung about its pivot 271 in an anti-clockwise direction viewing Fig. 24, thus exerting a pull on the link 270 and closing the suction intake valve 266 in the suction main 228, thus suction will be cut off from the suction head in case no box is in position to receive a label.

It will be understood that the cam 256 is so arranged as to cause the valve control block to connect the suction head through the valve casing 229 to a source of suction when the suction head is disposed in position above the stack of labels and to maintain the suction line between the suction head and the source of suction open during the movement of the transfer carriage to a position over the cover of the box upon which the label is to be deposited. The cam will then move the cam lever 254 and valve control block to the position shown in Fig. 26 whereupon the suction line will be closed and the air will enter the suction head, thereby discharging the label on the box cover.

Label stack feed mechanism.

For an illustration of this structure, attention is particularly directed to Figs. 4, 5, 7, 8 and 9.

The labels are arranged in a vertical stack 285 mounted on a table or plate 286. The plate 286 has a pair of recesses or elongated slots 287 disposed at two opposite edges thereof and also has a slot 288 at each of the other two edges thereof.

There is mounted in each of the slots 287 a vertical supporting post 290, the upper ends of each pair of posts 290 being connected by a cross bar 291. A brush 292 is secured to each end of the bar 291 and a brush 293 is secured intermediate the ends of the right hand bar 291 (see Fig. 7), these brushes as shown in Fig. 9 engaging the outer edges of the labels disposed at the top of the stack. The cross bar 291 at the left in Fig. 7 does not have a brush 293 intermediate the ends thereof, but is provided with a spring clip 295 which as shown in Fig. 9 rests upon the outer edge of the top label.

Figure 8:
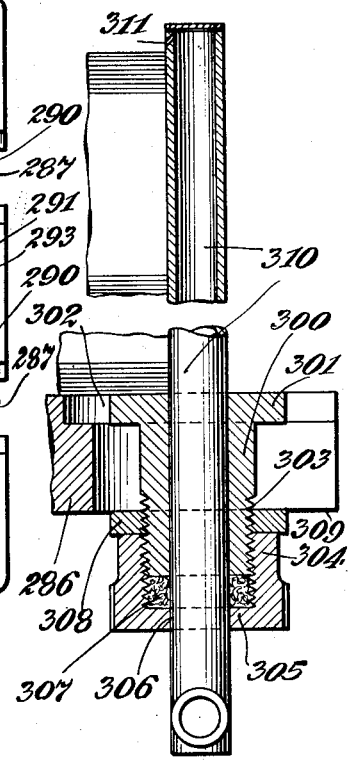
Fig. 8 is a detail sectional elevation on an enlarged scale taken substantially on line 8—8 of Fig. 7.

The posts 290 are adjustably mounted in the slots 287 in the manner shown in Fig. 8. As shown in this figure, a sleeve 300 is slidably mounted on each post and is provided with a flange 301 at its upper end which rests on the top of the plate 286 or on recessed portion 302 thereof. The sleeve 300 is threaded as shown at 303 and a nut 304 is mounted on the threaded portion of the sleeve. The nut has an inwardly extending flange 305 having an opening 306 receiving the post and packing 307 is interposed between the flange 305 and the lower end of the threaded portion 303 of the sleeve 300.

A collar 308 is threaded on the sleeve intermediate the upper end of the nut and the lower surface 309 of the plate 286. By loosening the nut 304 and the collar 308, the posts can be adjusted toward or away from the stack of labels, thus accommodating the posts and brushes to different sizes of labels.

The slots 288 have mounted therein in a manner similar to that above described, vertically extending hollow posts or tubes 310. These tubes have inwardly and downwardly directed openings 311 at their upper ends and the lower ends of the posts are connected by conduits 315 and 316 to a T coupling 317, which in turn is connected to a conduit 320. The latter conduit, 320, is connected through a control valve chamber 321 to an air pressure conduit 322 which receives compressed air from any suitable source of supply.

Means is provided for imparting a vertical movement to the plate or table 286 each time a label is withdrawn from the top of the stack. From the showing in Figs. 4 and 5, it will be seen that the table 286 has a flange 325 extending downwardly from the bottom thereof to which is secured the upper end of a bar 326 slidably mounted in a guideway 327. The guideway 327 is secured to a frame 330 which is mounted as shown in Fig. 5 on the under side of the bed plate 33. The bar 326 is retained in the guideway by vertically extending strips 331 and has formed on or secured to the inner surface thereof, a rack 333 which meshes with a gear 334 secured to a shaft 335 mounted in the frame 330. A hand wheel 336 is secured to one end of the shaft 335. A ratchet wheel 338 is also secured to the shaft 335 and is adapted to be engaged by a pawl 340 pivoted at 341 to a bracket 342 pivoted on the shaft 335. A cam 339 is carried by an extension secured to the frame 330 and is adapted to hold the pawl tooth out of engagement with the ratchet wheel when the bracket 342 is moved in a clockwise direction (see Fig. 5).

The bracket 342 is connected by a pin 343 to a link 344 which in turn is connected at its lower end as shown at 345 to a lever 346 pivoted on the shaft 112. The lever has a roller 347 disposed in a groove 348 of a cam 349 mounted on the cam shaft 38. A spring 351 is fixed at one end as shown at 352 and is connected at its opposite end 353 to bracket 342.

A spring 355 is connected at its lower end to a stud 356 projecting outwardly from the bar 326 and is connected at its upper end 357 to a lug 358 carried by the frame 330.

Operation of label stack feed mechanism.

As the cam 349 is rotated by the shaft 38, the bracket 342 will be rotated first in one direction and then in the opposite direction. During the rotation of the bracket on the shaft 335 in a clockwise direction (see Fig. 5), the pawl 340 will be moved out of the path of the ratchet wheel 338 and the spring 355 will pull the rack 333 and bar 326 upwardly, thus feeding the label stack upwardly.

The plate 286 will be fed upwardly by the bar, thus raising the stack of labels and disposing the top label in position to be removed from the stack by the suction head. As this label is removed from the top of the stack, air pressure directed downwardly onto the stack through the openings 311 in the conduits or hollow posts 310, will retain the next successive label in position on the stack and prevent its being removed therefrom. The brushes 292 and 293 also assist in retaining the labels in position on the stack.

When the table 286 is moved upwardly in the manner just described, this member will be forced upwardly on the posts 290 and hollow posts or conduits 310, this movement being permitted by the slidable connection of the posts and conduits in the sleeves 300. The packing 307 forms a friction connection between the table and the posts and retains these elements in their adjusted positions.

When the label stack supporting plate or table has been moved upwardly and a label has been removed therefrom, the cam 349 will cause the bracket 342 to move in a reverse direction or in an anti-clockwise direction, thus causing the pawl 340 to engage the ratchet wheel 338 and rotate this wheel and the gear 334 in an anti-clockwise direction. The rack 333 will be then moved downwardly by the gear 334, thus moving the label stack downwardly, permitting the suction or transfer head to transfer the label to the article on which it is to be deposited.

It will be understood that as the labels are withdrawn from the stack, the table or supporting plate 286 for the stack will move upwardly and thus the pawl will engage successive teeth.

*Adhesive applying mechanism.*

This mechanism is particularly illustrated in Figs. 5, 6, 13, 14 and 15.

Any suitable adhesive, such as glue may be utilized and is placed in a receptacle 365, mounted on blocks 366 which in turn are mounted on the bed plate or table 33. A shaft 370 is rotatably mounted in brackets 371 mounted on the bed plate 33 and has secured to one end, a sprocket wheel 372 connected by a chain 373 to a sprocket wheel 374 mounted on the drive shaft 45. The opposite end of the shaft 370 is geared as shown at 375 and 376 to a shaft 377 mounted in bearing blocks 378 adjustable in guideways 379 by means of a screw 380. The guideways 379 are formed in levers 385 pivoted on the shaft 370. Each of the levers has a lug 386 extending laterally therefrom and movable between set screws 387 and 388 mounted in lugs 390 and 391 formed on the brackets 371. The levers 385 are connected by a cross rod 395 on which is pivoted a link 396.

The adhesive or glue is fed from the receptacle 365 by a roller 400 mounted on the shaft 370 to a roller 401 mounted on the shaft 377 and is fed by the roller 401 to the under surface of the label when the suction or transfer head and the label are moved by the transfer carriage from label receiving to label discharging position.

The roller 401 is normally disposed in inoperative position, that is in a position below the path of travel of the suction head and label carried thereby and means is provided for moving the roller 401 to operative position whenever a label is fed by the suction head and transfer carriage. This means, however, is so constructed and arranged that in case a label is not picked up by the suction head, the roller 401 will not be moved to operative position. This control is exercised in the following manner.

*Control for adhesive applying mechanism.*

The link 396 extends downwardly through a slot 410 in the bed plate 33 and the lower end of the link is adjustably connected as shown at 411 to a sleeve 412 having lugs 413 connected to a U-shaped bracket 414. The bracket 414 is secured as shown at 415 to the center of a diaphragm 420 secured at its outer periphery as shown at 421 to a casing 422. The casing 422 is carried by posts 419 secured to the bed plate 33. This casing has formed therein a chamber 423 which is closed at its top by the diaphragm 420 and is connected by a conduit 424 and a flexible pipe 425 to the conduit 215 carried by the suction head 190. Conduit 215 communicates through the conduit 206 with the suction conduit 207.

The link 396 has secured thereto a collar 430 and a spring 431 surrounds the link 396 and is interposed between the collar 430 and a washer 432 which surrounds the link and bridges the slot 410 in the bed plate 33.

When the suction line to the conduit 207 is connected to the suction main, the suction will be communicated through the conduit 206 to conduit 215 and thence through the pipe 425 to the conduit 424 and chamber 423. This will cause the diaphragm 420 to be depressed, thus exerting a downward pull on the link 396, swinging the levers 385 about the shaft 370 and elevating the adhesive feed roller 401 to operative position or to a position in which this roller will engage the under surface of the label being fed by the suction head and transfer mechanism from the label stack to label discharging position above the cover on which the label is to be deposited.

However, in case the suction line is closed by the valve 266 which is controlled by the lever 271 and roller 275 or is closed by the suction control valve 240, no suction will be communicated through the conduit 215, pipe 425 and conduit 424 to the suction chamber 423, and, therefore, the spring 431 will exert an upward force on the link 396, thus moving the levers 385 in a direction to depress the roller 401 and hold the roller in inoperative position.

Furthermore, even if the suction line to the suction head is operating but no label is disposed on the bottom of the suction head, the effect of the suction will be vitiated by reason of the fact that the openings 210 to the bottom of the suction head will admit air to the suction head. The admission of air to the suction head and to the conduits therein will counteract the effect of the suction and, therefore, the suction will not be communicated through the conduit 206 and conduit 215, pipe 425 and conduit 424 to the chamber 423 to an extent sufficient to overcome the action of the spring 431. Thus, the roller 401 will be held in inoperative position unless a label is being fed by the suction head. The up and down movement of the levers 385 is limited by the adjustable stops 387 and 388.

In order to prevent the label which is receiving adhesive, from being carried around the roller 401, a plurality of strippers 440 are mounted on rods 441 and 442 as shown in Figs. 13 and 14. The rod 442 is carried by plates 444 mounted on the rod 441 and collars or sleeves 445 are mounted on the rod 442 between the adjacent stripper fingers.

The roller 401 is provided with circumferential grooves 446 therein into which the ends of the stripper fingers 440 extend as shown in Fig. 16.

In order to prevent an exceess of adhesive or glue from being carried around in the grooves 446 of the rollers 401, rings 450 are mounted on the outer periphery of the roller 400. The rings 450 are loosely mounted on the roller and extend into the grooves 446 of the roller 401.

In order to prevent an excess of glue or adhesive from being carried by the roller 400 to the roller 401, a bar 453 is mounted at its ends on the brackets 371 and is provided with notches 454 for receiving the rings 450.

From the foregoing description, it will be evident that whenever a label is fed across the adhesive applying mechanism, the roller 401 will be raised into a position in which this roller will apply the adhesive or glue to the under surface of the label. However, in case the label transfer or suction head moves across the top of the adhesive applying mechanism but has no label secured to the suction head, the adhesive applying mechanism will be retained in inoperative position, thus preventing the adhesive or glue from being applied to the under surface of the suction head.

*Presser mechanism for applying labels to box covers.*

This structure is particularly illustrated in Figs. 2, 3, 4, 17, 18, 19 and 20 and a modified structure is shown in Figs. 21 and 22.

When the boxes are fed along the tracks or rails 56 and 57, the cover of the box is folded back and rests on a plate 460 carried by the frame 59.

The transfer or suction head and transfer carriage are moved in the manner hereinbefore described from label receiving to label discharging position and in this latter position, the label 461 will be positioned above the cover 462 of the box and one edge of the label will project over the inner edge of the cover as shown at 463 in Fig. 17. When the label has reached this position, transfer and presser mechanism will engage the suction head and press this member downwardly so that the label will be pressed against the inner surface of the cover. At this time, the cam control devices for the suction head will cut off the suction from the head and open the head to atmospheric pressure so that the label will be transferred to the cover.

The presser and transfer mechanism comprises a pair of bars 465 and 466 carried by heads 468 slidably mounted on posts 470 and 471 suitably supported on the frame of the machine. Each of the heads has connected thereto a link 472 which is connected at 473 to one end of a lever 474, the levers being pivoted at 475 to brackets 476.

The rear end of each lever is pivoted at 480 to a link 481 and the opposite end of each of the links 481 is pivoted at 482 to a lever 483 which in turn is pivoted on the shaft 112.

Each of the levers 483 has secured thereto a stud or roller 485 disposed in a cam groove of a cam 486 mounted on the cam shaft 38. As the cam 486 is rotated, the links 481 will oscillate the levers 474 about their pivots 475, thus raising and lowering the presser bars 465 and 466.

Figure 2:
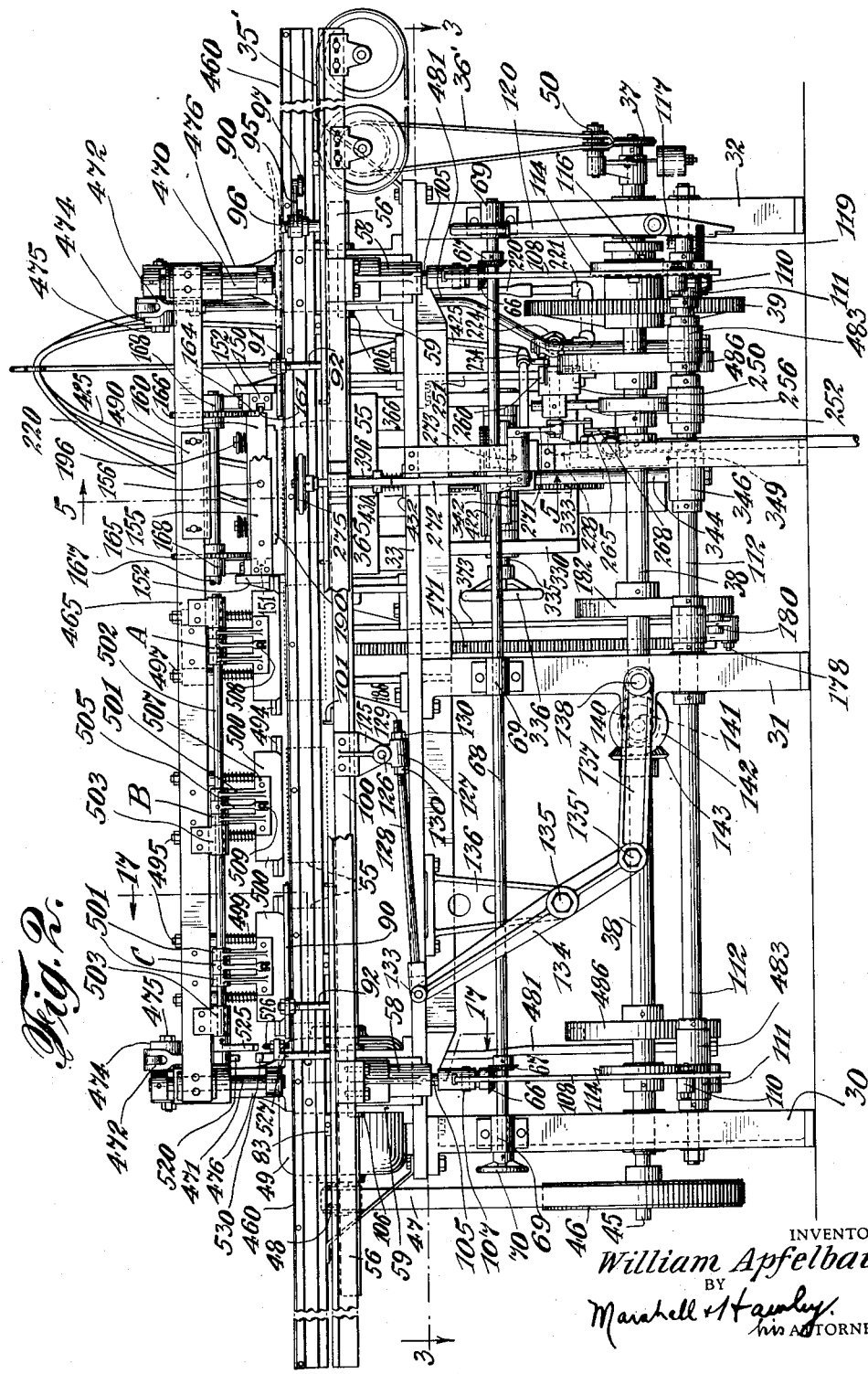
Fig. 2 is a front elevation of the machine shown in Fig. 1.
Figure 3:
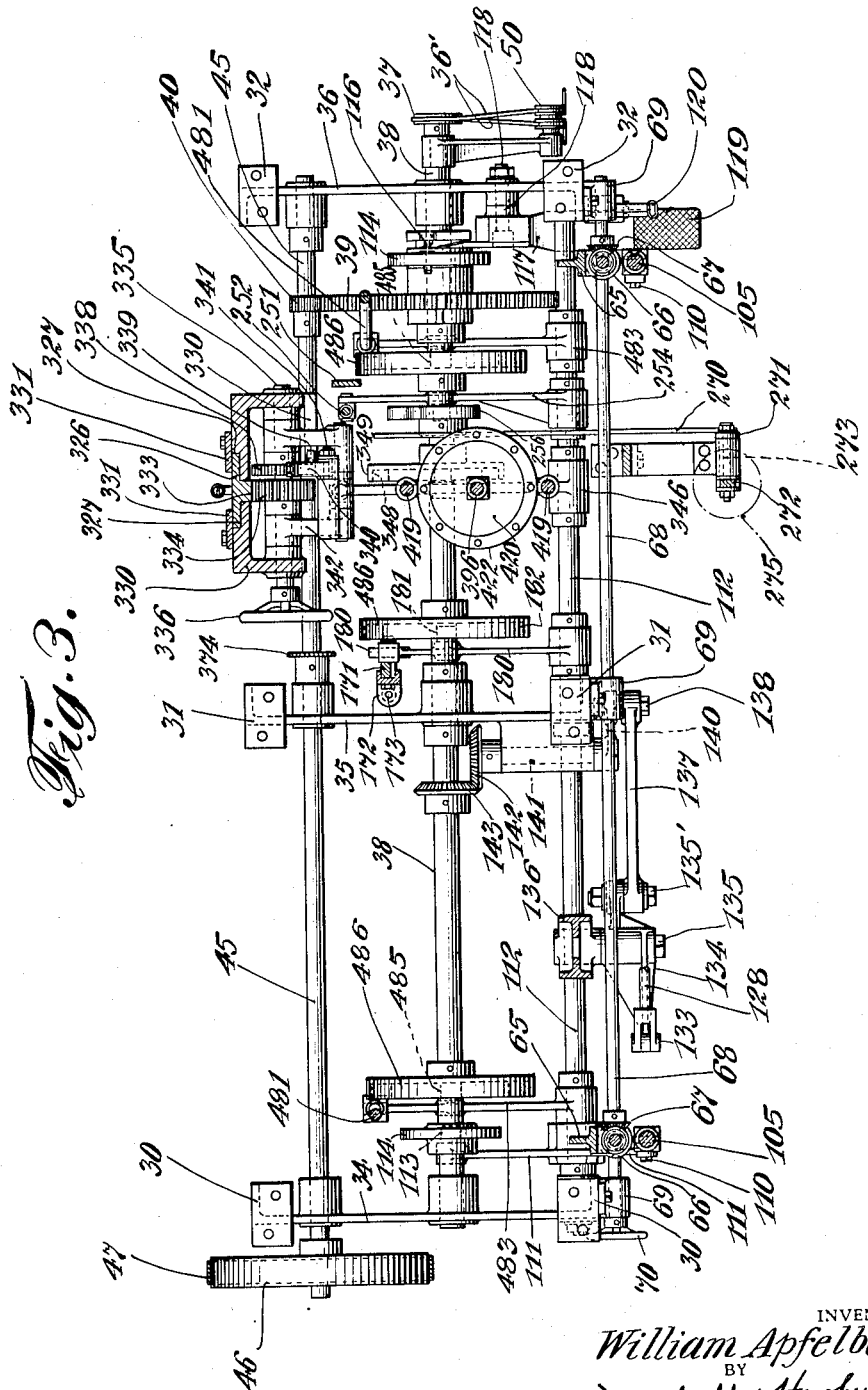
Fig. 3 is a longitudinal sectional elevation taken substantially on line 3—3 of Fig. 2 and showing in plan various driving connections, gearing, cams and so forth.
Figure 4:
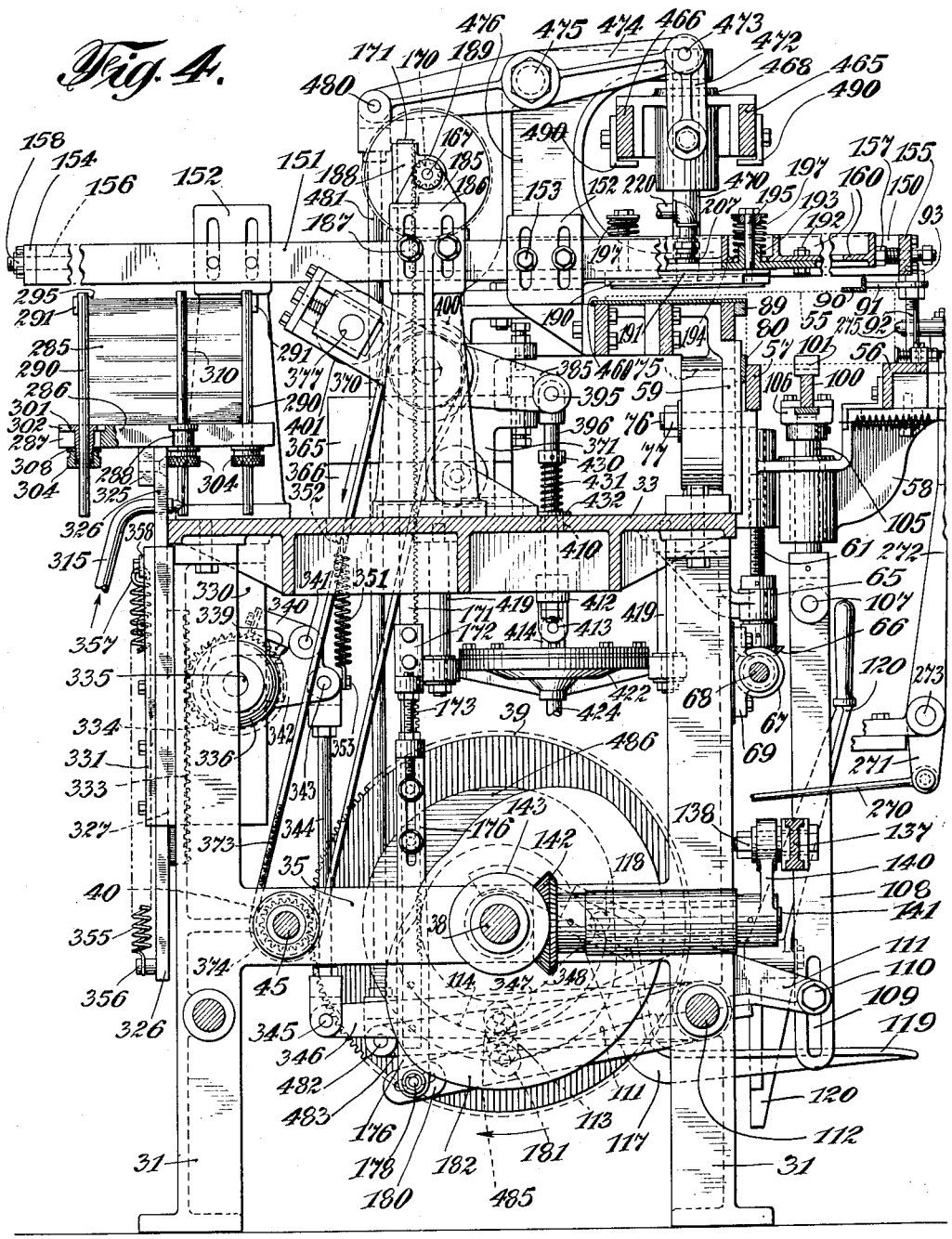
Fig. 4 is an enlarged sectional elevation taken substantially on line 4—4 of Fig. 1.
Figure 5:
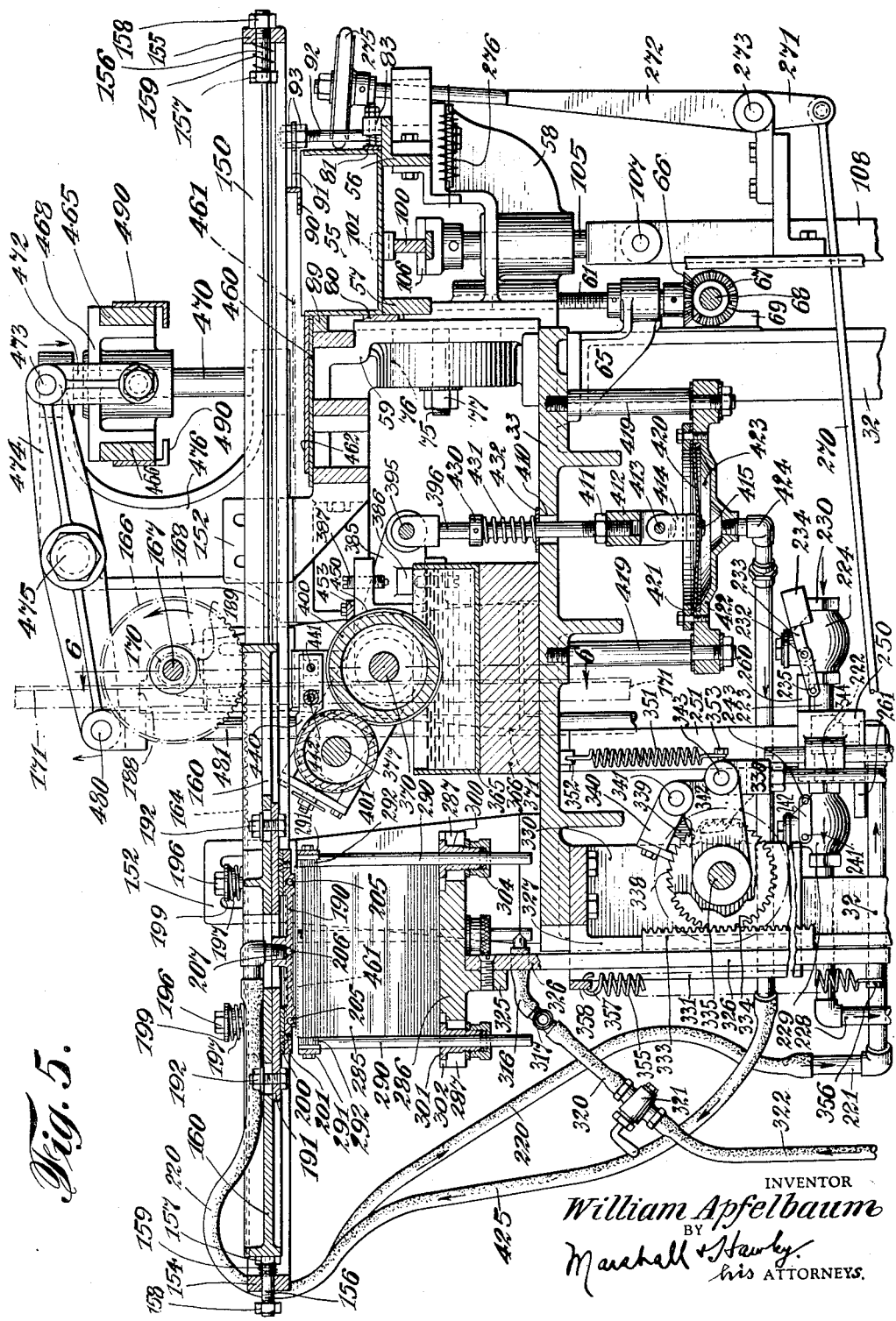
Fig. 5 is an enlarged sectional elevation taken substantially on line 5—5 of Fig. 2.

From the showing in Figs. 2 and 4, it will be seen that an angle bar 490 is adjustably secured to the outer surface of each of the presser bars 465 and 466. These angle bars as shown in Fig. 4 are disposed above the upper ends of the studs 195 or above the heads 196 whereby when the presser bars 465 and 466 are depressed, the studs will be forced through the bosses 193 and the suction or transfer head will be depressed thereby to position the label in engagement with the upper surface of the box cover 462.

The presser bars also have secured thereto a plurality of successively operating presser devices adapted to engage and press the label against the inside of the cover and also against the inner surface of the inner wall of the box. These successively operating presser devices are shown in Fig. 2 at A, B and C and since they are exactly similar in construction, only one of these devices will be described in detail.

The construction of the devices A, B and C is particularly illustrated in Figs. 17, 18 and 19. Each of the devices comprises a presser foot 494 carried by a pair of posts or spindles 495 slidably mounted in a head 496 secured between the bars 465 and 466. Each presser foot 494 has recesses 493 formed therein to receive the rear edge portions of the ends of the box and each presser foot 494 has a bottom or label engaging surface 492 of rubber or like material. Nuts 497 and 498 are threaded on the upper end of the spindle in the head 496. A spring 499 is interposed between the head 496 and the presser foot and tends to push the presser foot downwardly to the position shown in Fig. 17.

When the bars 465 and 466 are depressed by the levers 474, the heads 496 will press downwardly on the spring 499 and through the spring will exert a resilient downward pressure on the presser foot 494, thus pressing the foot into engagement with the label.

In addition to pressing the label against the inner surface of the box cover, means is provided for pressing the overlapping portion 463 of the label against the inner surface of the back wall of the box. This is accomplished by a plate 500 having arms 501 pivoted on a shaft 502 journaled in brackets 503 carried by the outer bar 465. Intermediate each of the arms 501 there is disposed an arm 505 secured by a set screw 506 to the shaft 502. In the form of the invention illustrated, the arms 501 are connected by a bar 507 and there is secured to this bar intermediate its ends a stud 508 which projects outwardly from the bar and extends through a notch 509 formed at the end of the arm 505. Nuts 510 are secured on the outer end of the stud 508 and a spring 511 is interposed between the inner surface of the arm 505 and the outer surface of the bar 507.

A strap 515 of leather or other suitable material, is secured around the inner surface of the plate 500 for engagement with the overlapping end 463 of the label 461, the strap being stretched over a bar 516.

An arm 520 is secured to the shaft 502 and is actuated in one direction by a spring 521 having one end secured to the lever and its opposite end secured to a lug 522 carried by the bar 466. The movement of the arm 520 under the action of the spring 521 is limited by an adjustable stop 523 carried by the head 496. An arm 525 is also connected to the shaft 502 and extends on the opposite side thereof from the arm 520. This arm is adapted to be engaged by an adjustable stop 526 carried by a bracket 527 mounted on the rail or track 56.

A latch 530 is pivoted on the frame 59 and is adapted to engage the rear end 531 of the arm 520 when the presser foot or the bars 465 and 466 have been depressed to the position shown in Fig. 19.

*Operation of label presser devices.*

In Fig. 17 the presser foot 494 and the plate 500 are shown in inoperative position or prior to their operation. When the levers 474 are rocked by the mechanism hereinbefore described, the bars 465 and 466 will be depressed carrying with them the heads 496 and through the springs 499 exerting a resilient downward pressure on the presser feet 494. At the same time, the heads 496 will carry downwardly the plates 500 which will be forced in an anti-clockwise direction to press the overlapping end 463 of each label against the inner surface of the back wall of the box. This will be accomplished by the action of the spring 521 and arm 520 which will cause the shaft 502 to be rotated and with the shaft, the arms 505. The springs 511 between the arms 505 and the bar 507 exert a resilient pressure against the bar, thus forcing the leather strap 515 carried by the plate 500 against the overlapping end 463 of the label.

When the presser devices approach their lowermost position, an arm 525 will engage the stop 526 as shown in Fig. 18 and cause the end 531 of the arm 520 to snap under the latch 530. Thereafter when the opposite tilting movement of the levers 474 causes the bars 465 and 466 and the parts carried thereby to be raised, the plates 500 will be moved outwardly from the overlapping portions 463 of the labels 461 which have been secured to the inner surface of the back walls of the boxes. This prevents any rubbing or lateral movement of the overlapping portion 463 of the label which has been secured to the inner surface of the rear wall of the box.

As the bars 465 and 466 and heads 496 move upwardly, the arm 520 will be withdrawn from beneath the latch 530 and will again take the position shown in Fig. 17.

A slightly different form of presser device for pressing the overlapping portion 463 of the label 461 against the inner surface of the back wall of the box is illustrated in Figs. 21 and 22. In this form of the invention, a frame 535 is secured to the shaft 502 and is engaged by a spring 536 which tends to press the frame in an anti-clockwise direction viewing Fig. 22. The frame 535 carries a shaft or spindle 537 at its outer end on which are mounted rollers 538. The movement of the frame and rollers is limited as shown in Fig. 22 by the front edge 539 of the presser foot 494.

It will be evident that when the bars 465 and 466 are depressed, the rollers 538 will engage the overlapping edge 463 of the label 461 and press this edge portion against the inner surface of the back wall of the box.

Summary of operation.

The boxes are first fed into the machine by the endless conveyor 35' and are stopped by the resilient stop-lever 97 in a position to be engaged by one of the lugs 101 carried by the feed bar 100. From the endless conveyor 35', the boxes are fed to the tracks or rails 56 and 57 by the lugs 101 and they will be first fed to the position beneath the frame formed by the tracks 150 and 151 and the connecting members 154 and 155. When a box is being fed to this position, a label will be picked up from the stack 285 by the suction and transfer head 190 and the transfer carriage 160 will be moved in the transfer frame to a position in which the transfer head will be disposed above the cover 462 of the box. During this movement of the suction head and transfer carriage, the suction conduits will be open to the suction head and the label will be held in position by suction until the suction head is disposed above the box cover.

At this period in the cycle of operation of the machine, the levers 474 will depress the bars 465 and 466 and the angle bars 490 will engage the nuts 196 on the upper ends of the posts 195, thus depressing the suction head and pressing the label against the inner surface of the box cover. At this point, the suction to the head will be cut off and air will be admitted, thus permitting the label to be transferred to the cover of the box.

During the movement of the label from the position above the stack to the position above the box cover, the adhesive applying mechanism will be operated to apply adhesive or glue to the under surface of the label, but as has been pointed out this mechanism will be held inoperative in case no label is carried by the suction head. Furthermore, the suction line to the suction or transfer head will be closed in case no box is in position to receive the label by the inward movement of the lever 271 under the action of spring 276.

As has been hereinbefore described, each time the suction head is in position to receive a label, the label stack support or table 286 will be moved upwardly to place a label in position to be removed by the suction head. At this time, the air blast through the openings 311 will prevent more than one label from being removed from the stack. In the manner hereinbefore described, the table or support for the stack will be gradually fed upwardly, thus insuring the proper positioning of the labels to permit their removal by the suction head.

After the box leaves the label receiving position, the label will be successively acted upon by the presser devices in the manner shown in Figs. 17, 18 and 19 and by means of these devices, the label will be securely pressed against the cover and against the inner surface of the rear wall of the box. By reason of the latch mechanism 530, the presser plate for pressing the overlapping edge 463 of the label against the rear wall of the box will be moved laterally from this portion of the label prior to the upward movement thereof, thus preventing any tendency of this plate to disarrange or remove this portion of the label from the box.

In the embodiment of the invention shown in Figs. 21 and 22, the overlapping portion of the label is operated upon by the rollers 538 instead of by the presser plate 500.

From the foregoing description it will be seen that a simple and practical machine has been designed for applying labels to boxes or other articles and by reason of the various details described, action of the machine has been made positive and efficient and the successful operation thereof has been insured.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. In a labeling machine, means for supporting and feeding an article to be labeled, means for supporting a stack of labels, and means movable substantially in a straight line and transversely of the path of movement of the articles for removing the labels one at a time from the label stack and depositing the labels on the articles.

2. In a labeling machine, means for supporting and feeding an article to be labeled, means for supporting a stack of labels, and means including a single transfer head movable substantially in a straight line and transversely of the path of movement of the articles for removing the labels one at a time from the label stack and depositing the labels on the articles.

3. In a labeling machine, means for supporting and feeding an article to be labeled, means for supporting a stack of labels, and means including a single transfer head movable substantially in a straight line and transversely of the path of movement of the article for removing a label from the stack, transporting a label to a position above the article to receive the label and depositing the label on the article.

4. In a labeling machine, means for supporting a supply of labels, means movable in a single direction from the label supply to the article to receive the label for removing a label from the supply, transporting a label to the position above the article and depositing the label on the article, and means below the path of movement of the label from the label supply to the article and between the supply and the article for applying adhesive to the label.

5. In a labeling machine, means for supporting an article to be labeled, means movable in a single direction from the label supply to the article to receive the label for supporting a stack of labels, means for removing a label from said stack and depositing the label on the article, and means intermediate the label stack and the supporting means for the article to be labeled for applying adhesive to one surface of the label.

6. In a labeling machine, means for supporting an article to be labeled, means for supporting a stack of labels, means for removing a label from said stack and depositing the label on the article to be labeled, means intermediate the label stack and the supporting means for the article to be labeled for applying adhesive to one surface of the label, said adhesive applying means being normally disposed in inoperative position, and suction operated means constructed and arranged to move said adhesive applying means to operative position only when a label is fed from the stack to the article to receive the label.

7. In a labeling machine, means for supporting a supply of labels, means for supporting an article to receive a label, means including a suction transfer head for removing a label from the label supply and depositing the label on the article to be labeled, means for applying adhesive to one surface of the label as the label is transferred from the label supply to the article, and suction operated means controlled by the suction head for moving said adhesive applying means into operative position to apply the adhesive to the label.

8. In a labeling machine, means for supporting a supply of labels, means for supporting an article to receive a label, means including a suction transfer head for removing a label from the label supply and depositing the label on the article to be labeled, a suction main connected to said transfer head, valve means in said suction main, and means engageable with the article to receive a label for controlling said valve means.

9. In a labeling machine, means for supporting a supply of labels, means for supporting an article to receive a label, means including a suction transfer head for removing a label from the label supply and depositing the label on the article to be labeled, a suction main connected to said transfer head, valve means in said suction main, and means adapted to close said suction valve when no article is in position to receive said label.

10. In a labeling machine, means for supporting a supply of labels, means for supporting an article to receive a label, means including a suction transfer head for removing a label from the label supply and depositing the label on the article to be labeled, a suction main connected to said transfer head, valve means in said suction main, and a feeler device operative to hold the suction main valve open when an article is positioned to receive a label.

11. In a labeling machine, means for supporting a supply of labels, means for supporting an article to receive a label, means including a suction transfer head for removing a label from the label supply and depositing the label on the article to be labeled, a suction main connected to said transfer head, valve means in said suction main, and a feeler device engageable with the article to receive the label and adapted to hold the suction main valve open when an article is positioned to receive a label.

12. In a labeling machine, means for supporting a stack of labels, a transfer suction head for removing labels from said stack and for transferring the labels to the article to be labeled, a conduit connected to said suction head, conduits in said head communicating with said first named conduit, a plurality of openings through the lower surface of the suction head communicating with the conduits in said head, a coupling connected to said first named conduit, an air main communicating with said coupling, a suction main communicating with said coupling, a control valve in each of said mains, means for opening the suction main valve when the transfer head is in position to receive a label, and means for opening the air main valve when the transfer head is in position to deposit a label.

13. In a labeling machine, means for supporting a stack of labels, a transfer suction head for removing labels from said stack and for transferring the labels to the article to be labeled, a conduit connected to said suction head, conduits in said head communicating with said first named conduit, a plurality of openings through the lower surface of the suction head communicating with the conduits in said head, a coupling connected to said first named conduit, an air main communicating with said coupling, a suction main communicating with said coupling, a control valve in each of said mains, means for opening the suction main valve when the transfer head is in position to receive a label, means for opening the air main valve when the transfer head is in position to deposit a label, a valve in said suction main, and a feeler device engageable with the article to be labeled for controlling said suction main valve.

14. In a labeling machine, means for supporting and feeding an article to be labeled, means for supporting a stack of labels, label transfer means movable substantially in a single plane for removing a label from said stack and positioning the label above the article to be labeled, and means engageable with said transfer means for moving said transfer means adjacent the article to receive the label and depositing the label thereon.

15. In a labeling machine, means for supporting and feeding an article to be labeled, means for supporting a stack of labels, label transfer means movable substantially in a single plane for removing a label from said stack and positioning the label above the article to be labeled, and vertically movable means engageable with said transfer means for moving said transfer means in a direction at an angle to said plane toward the article to receive the label and depositing the label thereon.

16. In a labeling machine, means for supporting and feeding an article to be labeled, means for supporting a stack of labels, a transfer carriage movable from a position above the label stack to a position above the article to be labeled, a transfer head carried by said carriage and vertically movable with respect thereto, and means engageable with said transfer head when said head is in a position above the article to receive a label for depressing said head to deposit the label on the article.

17. In a labeling machine, means for supporting and feeding an article to be labeled, means for supporting a stack of labels, a transfer carriage movable from a position above the label stack to a position above the article to be labeled, a transfer head carried by said carriage and vertically movable with respect thereto, resilient means for holding said transfer head against the under surface of said carriage, and means engageable with said transfer head when said head is in a position above the article to receive a label for depressing said head against the action of said resilient means to deposit the label on the article.

18. In a labeling machine, means for supporting and feeding a box, means adjacent said supporting means for supporting the box cover in open position, means for feeding a label to a position above the cover and overlapping the box, means for depositing the label on said cover, and means subsequently engageable with the label for pressing the label against said cover and for pressing the overlapping portion of the label against the inner surface of the box.

19. In a labeling machine, means for supporting and feeding a box, means adjacent said means for supporting the cover of the box in open position, means for supporting a stack of labels, means for transferring a label from said stack to a position above the cover and overlapping the box, means for applying adhesive to the under surface of the label, and means for depositing the label on said cover with a portion of the label overlapping the box.

20. In a labeling machine, means for supporting and feeding a box, means adjacent said means for supporting the cover of the box in open position, means for supporting a stack of labels, means for transferring a label from said stack to a position above the cover and overlapping the box, means for applying adhesive to the under surface of the label, means for depositing the label on said cover with a portion of the label overlapping the box, and means for pressing said label against the cover and against an inner surface of the box.

21. In a labeling machine, means for supporting a box, step-by-step feed means for feeding said box along said supporting means, means adjacent said supporting means for supporting the cover of the box in open position, means for feeding a label to a position over the cover and overlapping a portion of the box and for depositing the label on said cover, and successively acting means adapted to engage the label in successive positions of movements of the box for pressing the label against the cover and for pressing the overlapping portion thereof against an inner surface of the box.

22. In a labeling machine, means for supporting an article to be labeled, means for supporting a stack of labels, a transfer head for transferring the labels from said stack to said article, means for feeding the stack upwardly to dispose the top label in a position to be engaged and fed by said transfer head, and means for feeding said stack downwardly after the top label has been removed therefrom by the transfer head.

23. In a labeling machine, means for supporting and feeding articles to be labeled, means for supporting a stack of labels, transfer means for transferring labels from the stack to the articles, the label supporting means comprising a table and upright posts adjustably carried thereby and frictionally connected thereto, and means for moving said table and posts upwardly to dispose the top label in position to be removed by the transfer means.

24. In a labeling machine, means for supporting and feeding articles to be labeled, means for supporting a stack of labels, transfer means for transferring labels from the stack to the articles, the label supporting means comprising a table and upright posts adjustably carried thereby, said posts forming guides for confining the stack of labels, and means for moving said table and posts upwardly to dispose the top label in position to be removed by the transfer means and downwardly after the top label has been removed.

25. In a labeling machine, means for supporting and feeding articles to be labeled, means for supporting a stack of labels, transfer means for transferring labels from the stack to the articles, the label supporting means comprising a table and upright posts adjustably carried thereby and vertically adjustable relative thereto, and resilient means for moving said table and posts upwardly to dispose the top label in position to be removed by the transfer means.

26. In a labeling machine, means for supporting and feeding articles to be labeled, means for supporting a stack of labels, transfer means for transferring labels from the stack to the articles, and means for directing an air blast downwardly against the top of the stack to retain thereon the labels not engaged by the transfer means.

27. In a labeling machine, means for supporting and feeding articles to be labeled, means for supporting a stack of labels, transfer means for transferring labels from the stack to the articles, the label supporting means comprising a base and vertically adjustable upright posts adjustably carried thereby and frictionally connected thereto, and means secured to said posts for engaging the marginal edges of the upper labels in said stack.

28. In a labeling machine, means for supporting and feeding articles to be labeled, means for supporting a stack of labels, transfer means for transferring labels from the stack to the articles, the label supporting means comprising a base and upright posts carried thereby, means secured to said posts for engaging the marginal edges of the upper labels in said stack, and means for directing an air blast against the top of the stack to retain thereon the labels not engaged by the transfer means.

29. In a labeling machine, means for supporting and feeding an article to be labeled, means for supporting a supply of labels, means including a carriage and a single transfer head movable transversely of the path of movement of the articles for removing the labels from the label supply and depositing the labels on the articles, means for connecting said head to a source of suction when the head is disposed in position to remove a label from the stack, means releasing said suction when the head is in position to deposit the label and means for moving said head relative to said carriage to deposit the label on the article.

30. In a labeling machine, means for supporting and feeding articles to be labeled, means for supporting a stack of labels, a carriage movable in a single plane and in a path transverse to the path of movement of the articles, a transfer head on said carriage and movable in said plane with said carriage from the label stack to a position above an article to receive the label, and means for depressing said head relative to said plane and carriage to deposit the label on the article.

31. In a labeling machine, means for supporting and feeding articles to be labeled, means for supporting a stack of labels, a carriage movable from a position above the label stack to a position above the article to be labeled, a transfer head on said carriage, movable therewith and relative thereto, and means engageable with said head when the carriage is disposed above an article to be labeled to depress said head and press the label on the article.

32. In a labeling machine, means for supporting and feeding articles to be labeled, means for supporting a stack of labels, a carriage movable from a position above the label stack to a position above the article to be labeled, a suction transfer head on said carriage, movable therewith and relative thereto, and means engageable with said head when the carriage is disposed above an article to be labeled to depress said head and press the label on the article.

33. In a labeling machine, means for supporting and feeding articles to be labeled, means for supporting a stack of labels, a carriage movable from a position above the label stack to a position above the article to be labeled, a transfer head on said carriage, movable therewith and relative thereto, and means engageable with said head when the carriage is disposed above an article to be labeled to depress said head and press the label on the article, and resilient means for returning said head to its normal position relative to said carriage.

In witness whereof, I have hereunto set my hand this 9th day of March, 1927.

WILLIAM APFELBAUM.